United States Patent
He et al.

(10) Patent No.: US 12,137,411 B2
(45) Date of Patent: Nov. 5, 2024

(54) METHOD AND APPARATUS FOR REDUCING UE POWER CONSUMPTION

(71) Applicant: Honor Device Co., Ltd., Shenzhen (CN)

(72) Inventors: Yanzhao He, Shenzhen (CN); Haiquan Yang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 30 days.

(21) Appl. No.: 17/766,842

(22) PCT Filed: Sep. 21, 2020

(86) PCT No.: PCT/CN2020/116390
§ 371 (c)(1),
(2) Date: Apr. 6, 2022

(87) PCT Pub. No.: WO2021/068730
PCT Pub. Date: Apr. 15, 2021

(65) Prior Publication Data
US 2024/0089853 A1    Mar. 14, 2024

(30) Foreign Application Priority Data

Oct. 8, 2019    (CN) .......................... 201910951471.3

(51) Int. Cl.
*H04W 52/02*    (2009.01)
*H04W 76/25*    (2018.01)
(Continued)

(52) U.S. Cl.
CPC ....... *H04W 52/0212* (2013.01); *H04W 76/25* (2018.02); *H04W 76/34* (2018.02); *H04W 88/06* (2013.01)

(58) Field of Classification Search
CPC . H04W 52/0212; H04W 76/25; H04W 76/34; H04W 88/06
(Continued)

(56) References Cited

U.S. PATENT DOCUMENTS 10,367,677 B2    7/2019  Parkvall et al.
10,531,292 B2 *  1/2020  Ben Henda ....... H04W 36/0038
(Continued)

FOREIGN PATENT DOCUMENTS

CN    101472259 A    7/2009
CN    103533598 A    1/2014
(Continued)

OTHER PUBLICATIONS

Panasonic, "Comparison on the scheduling points on coding chain (Update from R1-040845)," 3GPP TSG RAN1#38bis R1-041081, Seoul, Korea, Sep. 20-24, 2004, 8 pages.
(Continued)

*Primary Examiner* — Mark G. Pannell
(74) *Attorney, Agent, or Firm* — Leydig, Voit & Mayer, Ltd.

(57) ABSTRACT

The present disclosure provides a method and an apparatus for reducing user equipment (UE) power consumption, and relates to the field of wireless communications technologies. The method includes: obtaining, by a UE, a network configuration parameter of the UE, where the UE is an electronic device that supports a 5th generation mobile communications technology non-standalone (5G NSA) networking mode and/or a 5th generation mobile communications technology standalone (5G SA) networking mode; determining whether the network configuration parameter of the UE is less than a set threshold, where being less than the set threshold is used to indicate that an Internet speed of the UE is limited; and if the network configuration parameter of the UE is limited;

(Continued)

UE is less than the set threshold, starting, by the UE, a power consumption reduction procedure.

20 Claims, 17 Drawing Sheets

(51) Int. Cl.
    *H04W 76/34* (2018.01)
    *H04W 88/06* (2009.01)
(58) Field of Classification Search
    USPC .......................................................... 370/311
    See application file for complete search history.

(56) References Cited

U.S. PATENT DOCUMENTS

| | | | |
|---|---|---|---|
| 10,687,300 | B2 | 6/2020 | Youn et al. |
| 11,343,866 | B2 | 5/2022 | Ali et al. |
| 2013/0045744 | A1 | 2/2013 | Dimpflmaier et al. |
| 2020/0037204 | A1* | 1/2020 | Gurumoorthy ......... H04L 69/04 |
| 2022/0167181 | A1* | 5/2022 | Yu ........................ H04W 72/04 |

FOREIGN PATENT DOCUMENTS

| | | |
|---|---|---|
| CN | 103648088 A | 3/2014 |
| CN | 104936218 A | 9/2015 |
| CN | 105307228 A | 2/2016 |
| CN | 105376819 A | 3/2016 |
| CN | 106304194 A | 1/2017 |
| CN | 106879059 A | 6/2017 |
| CN | 107635277 A | 1/2018 |
| CN | 108174415 A | 6/2018 |
| CN | 108430101 A | 8/2018 |
| CN | 108702724 A | 10/2018 |
| CN | 109379767 A | 2/2019 |
| CN | 109639313 A | 4/2019 |
| CN | 110300461 A | 10/2019 |
| EP | 3474608 A1 | 4/2019 |
| RU | 2693848 C1 | 7/2019 |
| WO | 2019057269 A1 | 3/2019 |

OTHER PUBLICATIONS

Huawei, Hisilicon, "Sidelink physical layer procedures for NR V2X," 3GPP TSG RAN WG1 Meeting #98 R1-1908040, Prague, Czech Republic, Aug. 26-30, 2019, 25 pages.

Huawei, Hisilicon, "NR Paging Options," 3GPP TSG-RAN WG2 #101 R2-1803647, Athens, Greece, Feb. 26-Mar. 2, 2018, 11 pages.

Huawei, "Discuss grouping of Smarter requirements," 3GPP TSG-SA WG1 Ad-hoc on Smarter (5G) S1-153099, Vancouver, Canada, Oct. 19-21, 2015, 23 pages.

Huawei, Hisilicon, "DoS from External Network," 3GPP TSG SA WG3 (Security) Meeting #85 S3-161676, Santa Cruz de Tenerife (Spain), Nov. 7-11, 2016, 2 pages.

* cited by examiner

METHOD AND APPARATUS FOR REDUCING UE POWER CONSUMPTION

This application is a National Stage of International Application No. PCT/CN2020/116390, filed on Sep. 21, 2020, which claims priority to Chinese Patent Application No. 201910951471.3, filed on Oct. 8, 2019, the disclosures of which are hereby incorporated by reference in their entireties.

TECHNICAL FIELD

The present disclosure relates to the field of wireless communications technologies, and in particular, to a method and an apparatus for reducing UE (user equipment) power consumption.

BACKGROUND

Currently, networking modes in the 5G (5th generation mobile networks, or 5th generation wireless systems, or 5th generation mobile communications technology) technology of terminal devices may be roughly divided into two types: NSA (Non-Standalone) and SA (Standalone). An NSA technology means that both LTE (New Radio) are online. In this case, a UE needs to keep two modes online at the same time, and two sets of radio frequency channels need to be kept, and consequently, power consumption is relatively high. In the SA technology, supported specifications are higher than those in 4G (The fourth generation of mobile phone mobile communication technology standards), that is, a higher rate, a higher bandwidth, and more radio frequency antennas are supported. Therefore, power consumption is also higher than that in 4G.

When the 5G era comes, an operator provides packages with larger traffic, but usually does not provide unlimited high-speed data packages. A common practice is as follows: When traffic in a user's package is less than x G Bytes, use of 5G is not limited, and the rate is not limited; and when the traffic used by the user exceeds x G Bytes, an Internet speed of the user is limited, and the user cannot enjoy high-speed experience of 5G. In the prior art, after a network package of the UE is used up, an operator limits an Internet speed of the UE, but does not resolve the following scenario problem after the Internet speed is limited: The UE is still attached to a network standard with high power consumption, but enjoys a relatively low Internet speed. In addition, in the prior art, there is a measure for falling back from 4G to 3G (3rd-Generation of Wireless Mobile Telecommunications Technology) (or another network standard such as 2G (Second Generation of Wireless Mobile Telecommunications Technology)) based on remaining traffic, power, and another operating state of the UE. However, in the prior art, particularity of the 5G technology is not resolved; in particular, in the NSA and SA networking modes, no measure for reducing power consumption is proposed. In addition, the prior art does not consider that in a process of falling back from 4G to 3G, corresponding icons change, and a network standard icon of the UE changes from 4G to 3G, thereby reducing sensory experience of the user.

Based on this background, the present disclosure provides a method and an apparatus for reducing UE power consumption, so as to resolve a problem that after the Internet speed of a UE that supports 5G is limited, the UE cannot enjoy high-speed Internet access experience of 5G, but needs to endure high power consumption.

SUMMARY

The present disclosure provides a method and an apparatus for reducing UE power consumption, so as to effectively reduce power consumption of a UE and prolong a standby time of the UE while determining whether an Internet speed of the UE is limited in a 5G mode, thereby improving user experience. Specific content of the present disclosure is as follows:

According to a first aspect, the present disclosure provides a method for reducing user equipment (UE) power consumption, where specific content of the method includes: A UE obtains a network configuration parameter of the UE, where to distinguish from an existing technical solution, the UE is an electronic device that supports a 5th generation mobile communications technology non-standalone (5G NSA) networking mode and/or a 5th generation mobile communications technology standalone (5G SA) networking mode; after the UE obtains the network configuration parameter of the UE, the UE determines a value of the network configuration parameter of the UE and a set threshold, and the UE determines whether the network configuration parameter of the UE is less than the set threshold; and if the network configuration parameter of the UE is less than the set threshold, it indicates that an Internet speed of the UE is limited, and the UE starts a power consumption reduction procedure. In this way, unnecessary power consumption of the UE can be effectively reduced, thereby prolonging a standby time of the UE and improving user experience.

In a possible implementation of the first aspect of the present disclosure, when the UE is in the 5G NSA networking mode, the network configuration parameter of the UE includes an access point name-aggregate maximum bit rate (APN-AMBR) parameter, where the APN-AMBR is an upper limit of a sum of bit rates of all non-guaranteed bit rate (non-GBR) bearers of an access point name (APN), the APN-AMBR, which is specific to an APN, is used as a subscription parameter of each APN to limit a cumulative bit rate of all public data network (PDN) connections in a same APN, and a value of the APN-AMBR parameter may indicate an Internet speed allocated by a network operator to the UE; or when the UE is in the 5G SA networking mode, the network configuration parameter of the UE includes an aggregate maximum bit rate parameter of each session (Session-AMBR), where the Session-AMBR is an upper limit of a sum of bit rates of all non-GBR quality of service (QoS) flows of a protocol data unit (PDU) session, and a value of the Session-AMBR parameter may represent an Internet speed allocated by a network operator to the UE. In this way, the network configuration parameter of the UE can be used to determine whether the Internet speed of the UE is limited, so that the UE determines whether to perform a power consumption reduction procedure.

In a possible implementation of the first aspect of the present disclosure, a method for determining, by the UE, whether the network configuration parameter of the UE is less than the set threshold includes: when the UE is in the 5G NSA networking mode, the UE determines whether an uplink speed in the APN-AMBR parameter is less than a set first threshold, and/or the UE determines whether a downlink speed in the APN-AMBR parameter is less than a set second threshold; or when the UE is in the 5G SA networking mode, the UE determines whether an uplink speed in the Session-AMBR parameter is less than a set third threshold, and/or the UE determines whether a downlink speed in the Session-AMBR parameter is less than a set fourth threshold. In this way, the UE can determine whether the Internet speed of the UE is limited, so that the UE determines whether to perform the power consumption reduction procedure.

In a possible implementation of the first aspect of the present disclosure, before the UE determines whether the network configuration parameter of the UE is less than the set threshold, setting the set threshold by the UE is further included, and a method for setting the set threshold by the UE includes: The UE uses a first value entered by a user as the set threshold; or the UE sets a value of the network configuration parameter of the UE that is obtained when the Internet speed of the UE is not limited as the set threshold. In this way, the UE may determine, based on the set threshold, whether the Internet speed of the UE is limited, so that the UE determines whether to perform the power consumption reduction procedure. In this way, the set threshold can be used as a metric to determine whether the Internet speed of the UE is limited, so that the UE determines whether to perform the power consumption reduction procedure.

In a possible implementation of the first aspect of the present disclosure, after the UE starts the power consumption reduction procedure, the method further includes: The UE determines whether the UE has performed a power consumption reduction procedure; the UE determines whether the network configuration parameter of the UE is less than the set threshold; and if the UE has performed the power consumption reduction procedure and the network configuration parameter of the UE is not less than the set threshold, the UE starts a restoration procedure, where an operating state of the UE before the UE starts the power consumption reduction procedure is a first operating state, an operating state of the UE after the UE starts the power consumption reduction procedure is a second operating state, and that the UE starts the restoration procedure indicates a process in which the operating state of the UE changes from the second operating state to the first operating state. In this way, the UE may start the restoration procedure based on an actual situation, so as to achieve an optimal operating state.

In a possible implementation of the first aspect of the present disclosure, when the UE is in the 5G NSA networking mode, a method for starting the power consumption reduction procedure by the UE includes: disabling an LTE and NR dual-connectivity EN-DC capability of the UE. In this way, the UE can effectively reduce power consumption and prolong the standby time, thereby improving user experience.

In a possible implementation of the first aspect of the present disclosure, when the UE is in the 5G NSA networking mode, the method for starting the power consumption reduction procedure by the UE includes: disabling a millimeter wave function of the UE. In this way, the UE can effectively reduce power consumption and prolong the standby time, thereby improving user experience.

In a possible implementation of the first aspect of the present disclosure, when the UE is in the 5G NSA networking mode, the method for starting the power consumption reduction procedure by the UE includes: skipping disabling the Long Term Evolution (LTE) and 5G new radio (NR) dual-connectivity EN-DC capability of the UE, skipping measuring a new radio (NR) neighboring cell, and skipping responding to an action of adding a secondary cell group (SCG) on a network side. In this way, the UE can effectively reduce power consumption and prolong the standby time, thereby improving user experience.

In a possible implementation of the first aspect of the present disclosure, when the UE is in the 5G NSA networking mode, the method for starting the power consumption reduction procedure by the UE includes: The UE retains the LTE and NR dual-connectivity EN-DC capability, so as to reduce antenna resource configuration of the UE. In this way, the UE can effectively reduce power consumption and prolong the standby time, thereby improving user experience.

In a possible implementation of the first aspect of the present disclosure, when the UE is in the 5G NSA networking mode, the method for starting the power consumption reduction procedure by the UE includes: disabling a new radio-carrier aggregation (NR-CA) function of the UE. In this way, the UE can effectively reduce power consumption and prolong the standby time, thereby improving user experience.

In a possible implementation of the first aspect of the present disclosure, when the UE is in the 5G NSA networking mode, the method for starting the power consumption reduction procedure by the UE includes: cutting a carrier component (CC) capability of the UE in LTE and NR. In this way, the UE can effectively reduce power consumption and prolong the standby time, thereby improving user experience.

In a possible implementation of the first aspect of the present disclosure, when the UE is in the 5G NSA networking mode, the method for starting the power consumption reduction procedure by the UE includes: The UE disables the LTE and NR dual-connectivity EN-DC capability, and adjusts an LTE access capability category CAT of the UE based on an Internet speed limitation of the UE. In this way, the UE can effectively reduce power consumption and prolong the standby time, thereby improving user experience.

In a possible implementation of the first aspect of the present disclosure, when the UE is in the 5G SA networking mode, the method for starting the power consumption reduction procedure by the UE includes: disabling a millimeter wave function of the UE. In this way, the UE can effectively reduce power consumption and prolong the standby time, thereby improving user experience.

In a possible implementation of the first aspect of the present disclosure, when the UE is in the 5G SA networking mode, the method for starting the power consumption reduction procedure by the UE includes: The UE continues to camp on NR, so as to reduce the antenna resource configuration of the UE. In this way, the UE can effectively reduce power consumption and prolong the standby time, thereby improving user experience.

In a possible implementation of the first aspect of the present disclosure, when the UE is in the 5G SA networking mode, the method for starting the power consumption reduction procedure by the UE includes: The UE continues to camp on NR; and disabling the new radio-carrier aggregation (NR-CA) function of the UE. In this way, the UE can effectively reduce power consumption and prolong the standby time, thereby improving user experience.

In a possible implementation of the first aspect of the present disclosure, when the UE is in the 5G SA networking mode, the method for starting the power consumption reduction procedure by the UE includes: The UE uses fewer carrier components (CCs); or the UE uses a lower aggregate bandwidth. In this way, the UE can effectively reduce power consumption and prolong the standby time, thereby improving user experience.

According to a second aspect, the present disclosure provides an apparatus for reducing user equipment (UE) power consumption, where the apparatus includes an obtaining module 300, a determining module 400, a power consumption reduction procedure execution module 500, and a restoration procedure execution module 600. The obtaining module 300 is configured to obtain a network configuration parameter of a UE and a power consumption reduction procedure record of the UE, and the UE is an electronic device that supports a 5G NSA networking mode and/or a 5G SA networking mode. The determining module 400 is configured to determine whether the network configuration parameter of the UE is less than a set threshold, and determine whether the UE has performed the power consumption reduction procedure, where being less than the set threshold is used to indicate that an Internet speed of the UE is limited. The power consumption reduction procedure execution module 500 is configured to: when the determining module 400 determines that the network configuration parameter of the UE is less than the set threshold, execute the power consumption reduction procedure of the UE. The restoration procedure execution module 600 is configured to: when the determining module 400 determines that the UE has performed the power consumption reduction procedure, and when the determining module 400 determines that the network configuration parameter of the UE is not less than the set threshold, execute a UE restoration procedure. In this way, the apparatus for reducing user equipment (UE) power consumption can determine, based on the network configuration parameter of the UE that is obtained by the obtaining module 300, whether the Internet speed of the UE is limited, to determine whether the power consumption reduction procedure execution module 500 performs the power consumption reduction procedure of the UE, so as to effectively reduce power consumption of the UE, prolong a standby time of the UE, and improve user experience.

In a possible implementation of the second aspect of the present disclosure, when the UE is in the 5G NSA networking mode, the network configuration parameter of the UE includes an access point name-aggregate maximum bit rate (APN-AMBR) parameter, where the APN-AMBR is an upper limit of a sum of bit rates of all non-guaranteed bit rate (non-GBR) bearers of an access point name (APN), the APN-AMBR, which is specific to an APN, is used as a subscription parameter of each APN to limit a cumulative bit rate of all PDN connections in a same APN, and a value of the APN-AMBR parameter may indicate an Internet speed allocated by a network operator to the UE; or when the UE is in the 5G SA networking mode, the network configuration parameter of the UE includes an aggregate maximum bit rate parameter of each session (Session-AMBR), where the Session-AMBR defines an upper limit of a sum of bit rates of all non-GBR quality of service (QoS) flows of a PDU session, and a value of the Session-AMBR parameter may represent an Internet speed allocated by a network operator to the UE. In this way, the network configuration parameter of the UE can be used to determine whether the Internet speed of the UE is limited, so that the apparatus for reducing user equipment (UE) power consumption determines whether to perform the power consumption reduction procedure.

In a possible implementation of the second aspect of the present disclosure, the method for determining, by the determining module 400, whether the network configuration parameter of the UE is less than the set threshold includes: when the UE is in the 5G NSA networking mode, the determining module 400 determines whether an uplink speed in the APN-AMBR parameter is less than a set first threshold, and/or the determining module 400 determines whether a downlink speed in the APN-AMBR parameter is less than a set second threshold; or when the UE is in the 5G SA networking mode, the determining module 400 determines whether an uplink speed in the Session-AMBR parameter is less than a set third threshold, and/or the determining module 400 determines whether a downlink speed in the Session-AMBR parameter is less than a set fourth threshold. In this way, the apparatus for reducing user equipment (UE) power consumption can determine whether the Internet speed of the UE is limited, so as to determine whether to perform the power consumption reduction procedure.

In a possible implementation of the second aspect of the present disclosure, the method for executing the UE power consumption reduction procedure by the power consumption reduction procedure execution module 500 includes the methods and steps for performing UE power consumption reduction according to the possible implementations of the first aspect of the present disclosure. In this way, the apparatus for reducing user equipment (UE) power consumption can effectively reduce the power consumption of the UE and prolong the standby time of the UE, thereby improving user experience.

In a possible implementation of the second aspect of the present disclosure, before the determining module 400 determines whether the network configuration parameter of the UE is less than the set threshold, setting the threshold is further included, and a method for setting the set threshold includes: The obtaining module 300 uses a first value entered by the user as the set threshold; or the obtaining module 300 sets a value of the network configuration parameter of the UE that is obtained when the Internet speed of the UE is not limited as the set threshold. In this way, the set threshold can be used as a metric to determine whether the Internet speed of the UE is limited, so that the apparatus for reducing user equipment (UE) power consumption determines whether to perform the power consumption reduction procedure.

In a possible implementation of the second aspect of the present disclosure, a method for executing the UE restoration procedure by the restoration procedure execution module 600 includes: an operating state of the UE before the power consumption reduction procedure execution module 500 executes the UE power consumption reduction procedure is a first operating state, an operating state of the UE after the power consumption reduction procedure execution module 500 executes the UE power consumption reduction procedure is a second operating state, and that the restoration procedure execution module 600 executes the UE restoration procedure indicates a process in which the UE changes from the second operating state to the first operating state. In this way, the apparatus for reducing user equipment (UE) power consumption may start the UE restoration procedure based on an actual situation, so that the UE achieves an optimal operating state.

According to a third aspect, the present disclosure provides an apparatus for reducing user equipment (UE) power consumption, where the apparatus for reducing user equipment (UE) power consumption includes: a memory, a processor, and a computer program that is stored in the memory and that can be run on the processor, and when the processor executes the computer program, the UE is enabled to implement the method according to any one of the first aspect or the possible implementations of the first aspect of the present disclosure. In this way, unnecessary power consumption of the UE can be effectively reduced, thereby prolonging a standby time of the UE and improving user experience.

According to a fourth aspect, the present disclosure provides user equipment, where the user equipment includes a memory, a processor, and a computer program that is stored in the memory and can be run on the processor, and when the processor executes the computer program, the UE is enabled to implement the method according to any one of the first aspect or the possible implementations of the first aspect of the present disclosure. In this way, unnecessary power consumption of the UE can be effectively reduced, thereby prolonging a standby time of the UE and improving user experience.

According to a fifth aspect, the present disclosure provides a computer program, where when being run on a processor, the computer program is used to execute program code of the method according to any one of the first aspect or the possible implementations of the first aspect of the present disclosure. In this way, unnecessary power consumption of the UE can be effectively reduced, thereby prolonging a standby time of the UE and improving user experience.

According to a sixth aspect, the present disclosure provides a computer storage medium, where the computer storage medium includes a computer instruction, and when the computer instruction is run on an electronic device, the electronic device is enabled to execute program code of the method according to any one of the first aspect or the possible implementations of the first aspect of the present disclosure. In this way, unnecessary power consumption of the UE can be effectively reduced, thereby prolonging a standby time of the UE and improving user experience.

BRIEF DESCRIPTION OF DRAWINGS

To describe technical solutions in embodiments of the present disclosure more clearly, the following briefly describes accompanying drawings required for describing the embodiments.

DESCRIPTION OF EMBODIMENTS

The following describes technical solutions in the embodiments of the present disclosure clearly with reference to the accompanying drawings in the embodiments of the present disclosure.

A problem to be resolved in the present disclosure is to provide a method and an apparatus for reducing UE power consumption, so as to effectively reduce power consumption of a UE, prolong a standby time of the UE, and improve user experience.

In an implementation of the present disclosure, the UE refers to an electronic device that has a data calculation and processing function and a wireless communication function. The UE includes but is not limited to: a smartphone (such as an Android mobile phone, an iOS (iPhone Operating System) mobile phone, or a mobile phone running another operating system), a tablet computer, a palmtop computer, a portable multimedia player, an electronic photo frame, an electronic game console, a notebook computer, a mobile internet device, a wearable device (such as a smartwatch, a smart band, smart glasses, or a head mounted device (HMD)), a smart home device, an Internet of Things device, a smart car, or the like.

The foregoing lists some specific types of UEs. However, persons skilled in the art may be aware that the embodiments of the present disclosure are not limited to the foregoing listed types, but may be further applied to any other types of electronic devices and any other types of operating systems.

In descriptions in the embodiments of the present disclosure, "/" means "or" unless otherwise specified. For example, "A/B" may represent A or B. In this specification, "and/or" describes only an association relationship for describing associated objects and represents that three relationships may exist. For example, "A and/or B" may represent the following three cases: Only A exists, both A and B exist, and only B exists. In addition, in the descriptions in the embodiments of the present disclosure, "a plurality of" means two or more than two.

Figure 1:
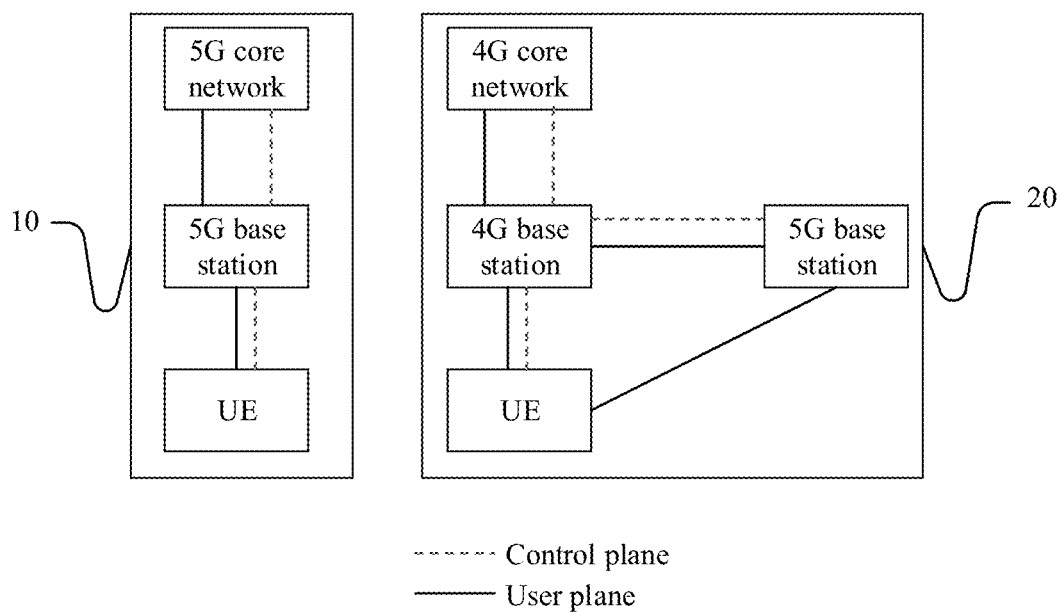
FIG. 1 is a schematic diagram of 5G NSA and SA networking modes according to an embodiment of the present disclosure.

Embodiments of the present disclosure provide a method and an apparatus for reducing UE power consumption. It should be noted that the method and the apparatus for reducing UE power consumption are based on a UE in different 5G networking modes. Because the UE may be connected to a base station or a core network in different manners, there are different operations for reducing power consumption. FIG. 1 is a schematic diagram of 5G NSA and SA networking modes according to an embodiment of the present disclosure. A module 10 shown in FIG. 1 is a diagram of the 5G SA networking mode, and a module 20 shown in FIG. 1 is a diagram of the 5G NSA networking mode. FIG. 1 provides only example diagrams of the 5G SA and NSA networking modes, and there may be other forms of the 5G SA and NSA networking modes, which are not limited by content described in FIG. 1.

Embodiment 1 of the present disclosure provides a method for reducing UE power consumption in a 5G NSA networking mode.

Figure 2:
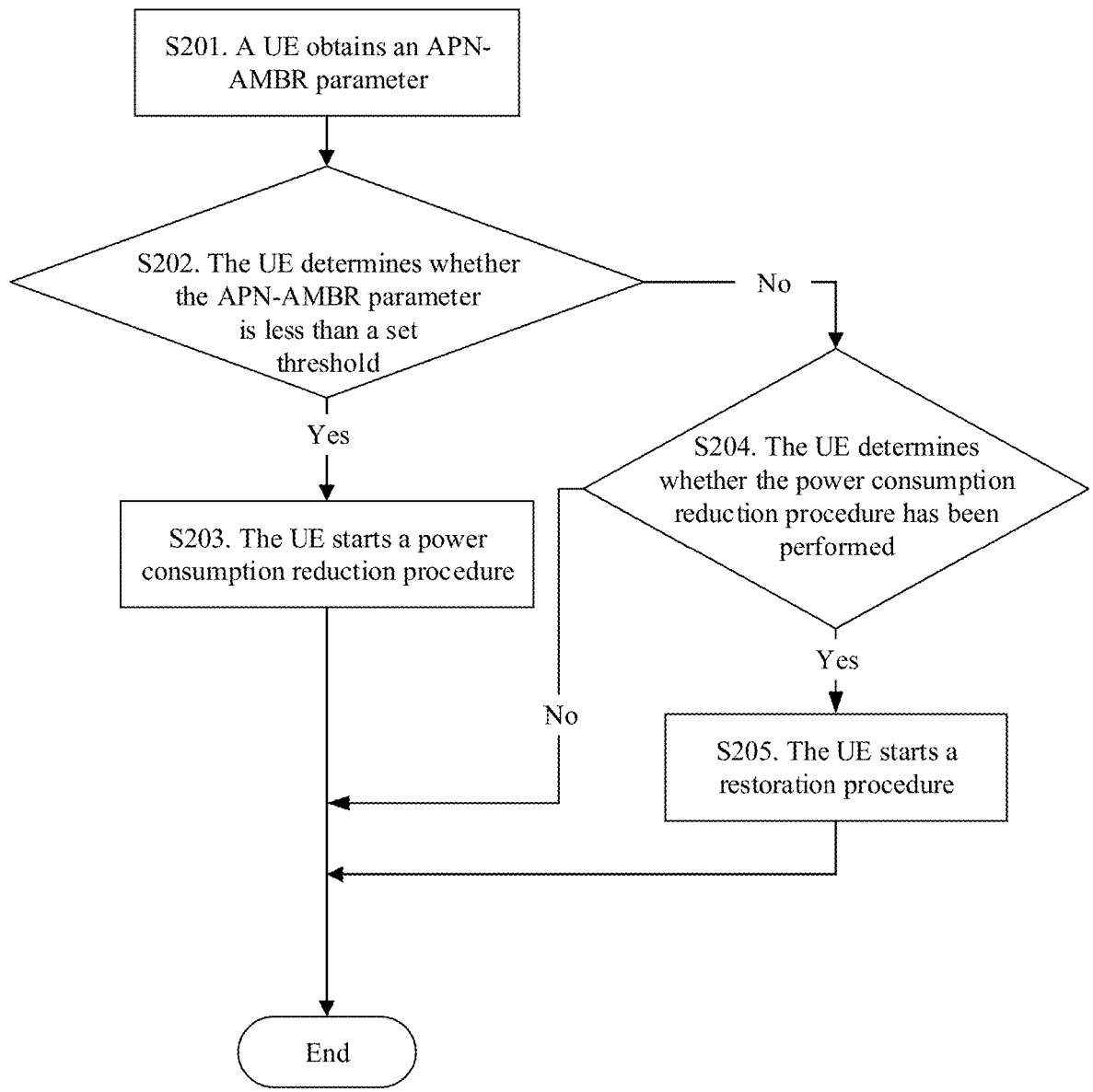
FIG. 2 is a schematic flowchart of reducing UE power consumption in a 5G NSA networking mode according to an embodiment of the present disclosure.

FIG. 2 is a schematic flowchart of a method for reducing UE power consumption in a non-standalone (5G NSA, Non-Stand Alone) networking mode according to an embodiment of the present disclosure. As shown in FIG. 2, the method may include:

S201. A UE obtains an APN-AMBR (Access Point Name-Aggregate Maximum Bit Rate) parameter.

In a 5G NSA standard, an LTE (Long Term Evolution) and 5G NR (New Radio) dual-connectivity mode is used; and 4G is used as a control plane anchor, a 4G base station (eNB) is a master station, a 5G base station (gNB) is a slave station, and a 4G core network is used. In the 5G NSA networking mode, a session establishment procedure or a session modification procedure is similar to that in LTE. Therefore, in this embodiment, a process of establishing or modifying a session between the UE and the network side is described by using a 4G PDN (Public Data Network) session establishment or session modification procedure. In the 4G PDN session establishment or session modification procedure, a UE side may obtain an APN-AMBR parameter, so as to determine whether an Internet speed of the UE is limited.

The APN-AMBR (Access Point Name-Aggregate Maximum Bit Rate) is an upper limit of a sum of bit rates of all non-GBR (Non Guaranteed Bit Rate) bearers of an APN (Access Point Name), and the APN-AMBR, which is specific to an APN, is used as a subscription parameter of each APN to limit a cumulative bit rate of all PDN connections in a same APN. That is, a value of APN-AMBR may be used to reflect an Internet speed allocated by a network operator to the UE. A downlink APN-AMBR is executed by a P-GW (PDN GateWay, PDN gateway), and an uplink APN-AMBR is executed by the UE and the P-GW. The APN-AMBR parameter obtained in step S201 may include the uplink APN-AMBR and/or the downlink APN-AMBR.

Figure 3:
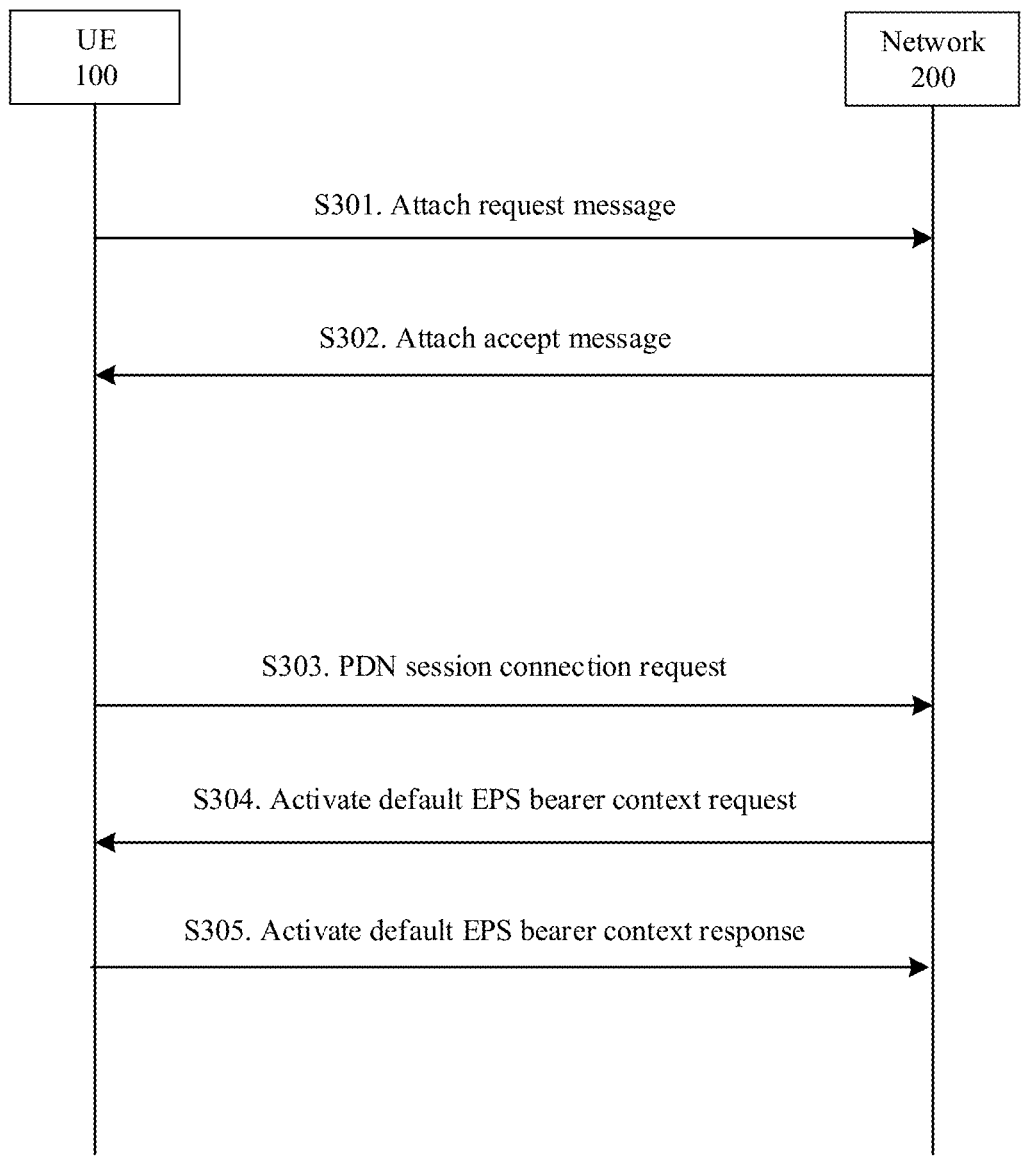
FIG. 3 is a schematic flowchart of a 4G PDN session establishment process in a 5G NSA networking mode according to an embodiment of the present disclosure.

FIG. 3 is a schematic flowchart of establishing a 4G PDN session in a 5G NSA networking mode according to an embodiment of the present disclosure. As shown in FIG. 3, the method may include:

S301. A UE sends an attach request message to a network (to better describe this solution, a base station, a core network, and the like are collectively referred to as a network side, hereinafter referred to as a "network side").

S302. The network side sends an attach accept message to the UE. The attach accept message includes an APN-AMBR parameter.

S303. The UE sends a PDN session request to the network side to activate a PDN to obtain a connection.

S304. The network side sends an activate default EPS (Evolved Packet System) bearer context request message to the UE, where the activate default EPS bearer context request message includes an APN-AMBR parameter.

S305. The UE sends an activate default EPS bearer context response message to the network side.

The method described in steps S301-S305 is based on a case in which the UE device may activate a default APN during an attach process when the UE device is powered on, and the UE sends an attach request message to the network side and carries a PDN activation request at the same time.

In another method in this embodiment, the APN-AMBR parameter may be obtained in a process in which the UE, after being attached, performs an APN handover or re-activates an APN. That is, the another method may include only step S303, step S304, and step S305, and the APN-AMBR parameter may be obtained from the EPS bearer context request message in step S304.

Both the attach request message and the activate default EPS bearer context request message in the 4G PDN connection establishment procedure include the APN-AMBR parameter, and the APN-AMBR parameter may be obtained in the foregoing two phases, so as to determine whether an Internet speed of the UE is limited.

Figure 4:
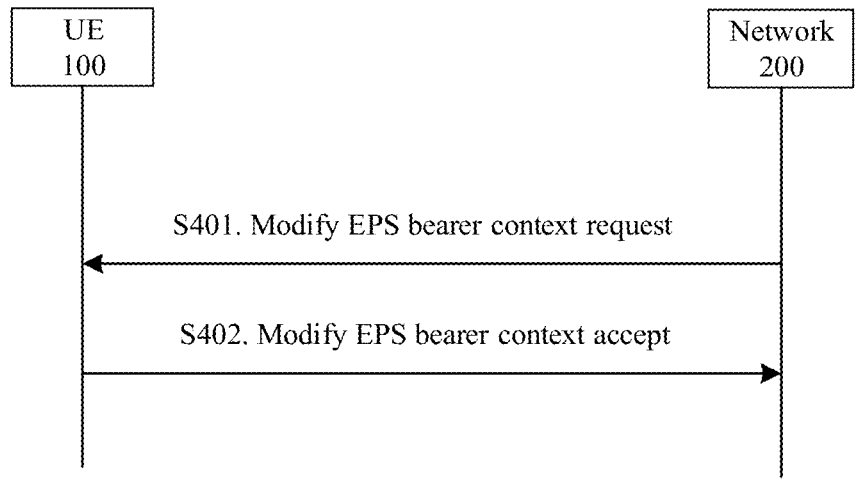
FIG. 4 is a schematic diagram of a 4G PDN session modification process in a 5G NSA networking mode according to an embodiment of the present disclosure.

FIG. 4 is a schematic flowchart of modifying a 4G PDN session in a 5G NSA networking mode according to an embodiment of the present disclosure. As shown in FIG. 4, the method may include:

S401. A network side sends a modify EPS bearer context request to a UE to initiate a PDN session modification process, that is, the PDN modification process is initiated by the network side. The modify EPS bearer context request message carries an APN-AMBR parameter. The APN-AMBR parameter may be used to determine whether an Internet speed of the UE is limited.

S402. The UE sends a modify EPS bearer context accept message to the network side.

In a 4G PDN session modification procedure, the APN-AMBR parameter may be obtained, so as to determine whether the Internet speed of the UE is limited.

S202. The UE determines whether the APN-AMBR parameter is less than a set threshold.

That is, it is determined whether a value of the APN-AMBR that is obtained by the UE is less than the set threshold. The set threshold is a value used to indicate whether the Internet speed of the UE is limited. For example, the Internet speed of a 5G package is 1 Gbps-4.5 Gbps (Gigabits per second, 1000 megabits per second), and the set threshold may be set to 1 Gbps. When the value of the APN-AMBR is less than 1 Gbps, it means that the Internet speed of the UE is limited. In this embodiment, the threshold may be set based on an actual scenario of the user. The value of the threshold is not limited in the present disclosure.

Before the step of determining whether the value of the APN-AMBR that is obtained by the UE is less than the set threshold, setting the set threshold is also included. Methods for setting the set threshold include:

Optional threshold setting method 1: The UE uses a first value entered by the user as a set threshold: For example, a function menu bar is added to a system of the UE, so that the user can independently select a threshold in the menu bar. For example, the user may select a threshold in the UE mobile network setting function menu, or the user may enter a threshold in the UE mobile network setting function dialog box, or the user may set a threshold in a UE voice assistant by using a voice input.

Optional threshold setting method 2: The UE sets a value of a network configuration parameter of the UE that is obtained when the Internet speed of the UE is not limited to the set threshold: For example, when the UE registers with a 5G network for the first time, the UE may obtain the APN-AMBR parameter in the attach process, and the UE may set the APN-AMBR parameter to the threshold.

The APN-AMBR parameter obtained by the UE includes a value of an uplink speed and a value of a downlink speed. A method for determining, by the UE, whether the APN-AMBR is less than the set threshold includes:

The UE determines whether the value of the uplink speed in the APN-AMBR parameter that is obtained by the UE is less than a set first threshold, for example, the uplink speed in the APN-AMBR parameter is less than 0.5 Gbps.

Alternatively, the UE determines whether the value of the downlink speed in the APN-AMBR parameter that is obtained by the UE is less than a set second threshold, for example, the downlink speed in the APN-AMBR parameter is less than 1 Gbps.

Alternatively, the UE determines whether the value of the uplink speed in the APN-AMBR parameter that is obtained by the UE is less than a set third threshold, and the UE determines whether the value of the downlink speed in the APN-AMBR parameter that is obtained by the UE is less than a set fourth threshold, for example, the uplink speed in the APN-AMBR parameter is less than 0.5 Gbps, and the downlink speed in the APN-AMBR parameter is less than 1 Gbps.

If the APN-AMBR parameter is less than the set threshold, step S203 is performed: The UE starts a power consumption reduction procedure. There may be a plurality of methods for reducing UE power consumption. The methods for reducing UE power consumption include:

Method 1 for reducing UE power consumption: If the APN-AMBR parameter is less than the set threshold, an EN-DC (Eutra NR Dual Connectivity) capability of the UE is not directly disabled, and only does not measure an NR neighboring cell.

"DC" represents dual connectivity; "E" represents E-UTRA(N) (Evolved Universal Terrestrial Radio Access (Network)), that is, a 4G radio access network, and "N" represents 5G NR (New Radio). EN-DC (Eutra NR Dual Connectivity) refers to dual connectivity of the 4G radio access network and the 5G NR. In the 5G NSA networking mode, the UE is connected to a 4G core network, a 4G base station is a master station, and a 5G base station is a secondary station. In this method, a dual-connectivity function of the 4G radio access network of the UE and the 5G NR is not directly disabled, and it is merely implemented that the UE no longer measures an NR neighboring cell, and no longer responds to an action of adding an SCG (secondary cell group) to a network; that is, the UE no longer adds the 5G NR, and the UE is connected only to the 4G network and is not connected to an NR network, thereby reducing power consumption of the UE.

Figure 5:
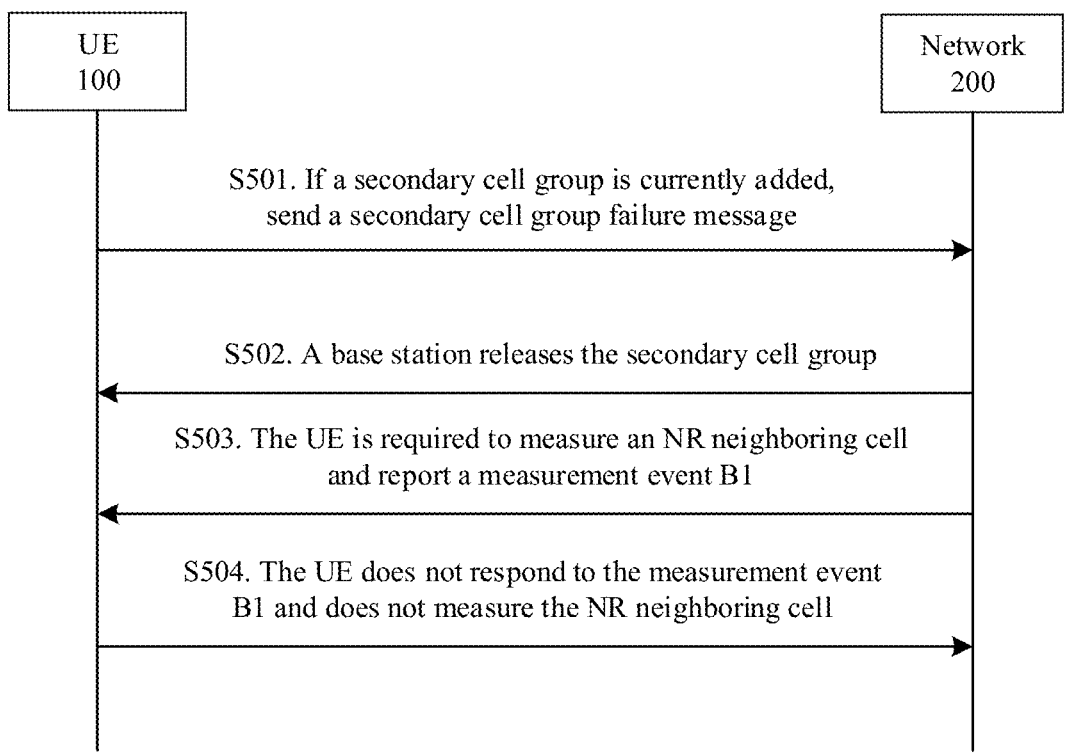
FIG. 5 is a schematic diagram of a method for starting power consumption reduction by a UE in a 5G NSA networking mode according to an embodiment of the present disclosure.

An implementation of method 1 for reducing UE power consumption includes a plurality of options. A specific implementation includes the following options:

Option 1: FIG. 5 is a schematic diagram of a method for starting power consumption reduction by a UE in a 5G NSA networking mode according to an embodiment of the present disclosure. As shown in FIG. 5, if the UE is currently in an RRC (Radio Resource Control) connection establishment state, the UE may send an SCG Failure Message (secondary cell group failure message) to the network side, so as to trigger a base station to release the SCG. In addition, to prevent the network side from adding NR again, the UE no longer locally measures the NR neighboring cell, and no longer responds to a measurement event B1 on the network side. For meanings of specific events, refer to Table 1.

TABLE 1

| | |
|---|---|
| Event A1 | A measured value (RSRP (Reference Signal Received Power, Reference Signal Received Power) or RSRQ (Reference Signal Received Quality, Reference Signal Received Quality)) of a serving cell is greater than a threshold. |
| Event A2 | The measured value (RSRP or RSRQ) of the serving cell is less than the threshold. |
| Event A3 | The measured value of a neighboring cell is better than the measured value of the serving cell by a threshold. |
| Event A4 | The measured value of a neighboring cell is greater than the threshold. |
| Event A5 | The measured value of the serving cell is less than threshold 1, and the channel quality of the neighboring cell is greater than threshold 2. |
| Event B1 | Channel quality of an inter-technology neighboring cell is greater than a threshold. |
| Event B2 | Channel quality of the serving cell is less than threshold 1, and the channel quality of the inter-technology cell is greater than a threshold 2. |

Figure 6:
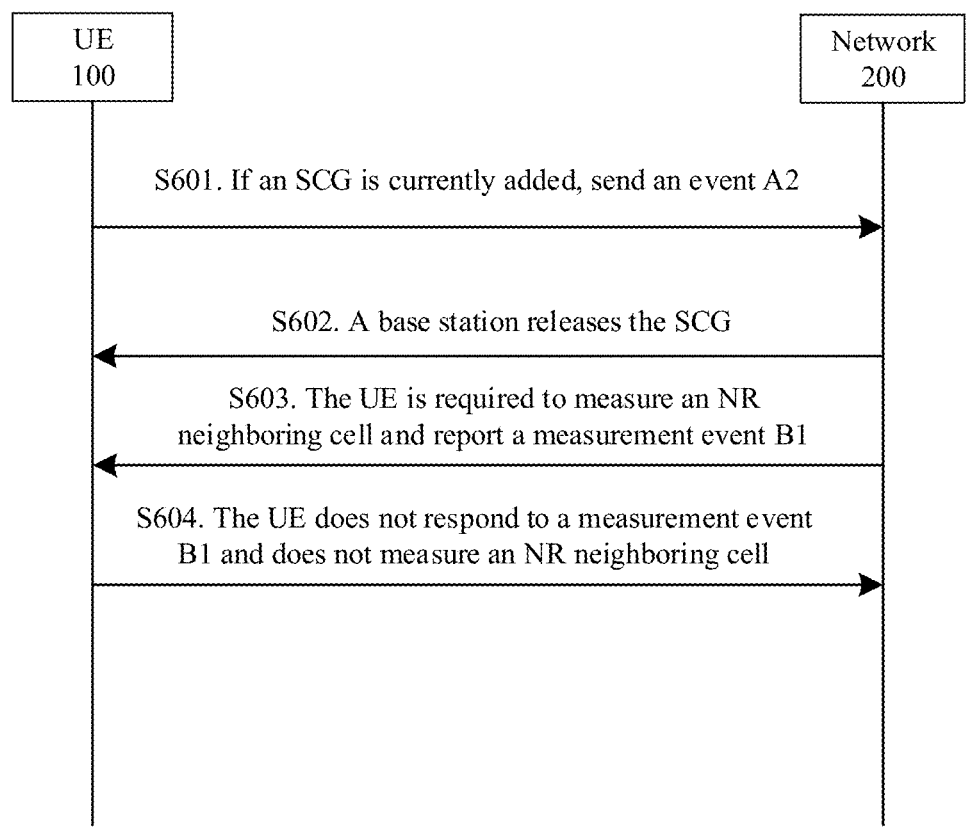
FIG. 6 is a schematic diagram of another method for starting power consumption reduction by a UE in a 5G NSA networking mode according to an embodiment of the present disclosure.

Option 2: FIG. 6 is a schematic diagram of another method for starting power consumption reduction by a UE in a 5G NSA networking mode according to an embodiment of the present disclosure. As shown in FIG. 6, if the UE is currently in an RRC connection setup state, and the network side configures a measurement event A2, the UE may forge a measurement event A2, and send the event to the network side to report that NR signal energy is a minimum value defined in a protocol, so as to trigger the base station to release the SCG. In addition, to prevent the network side from adding NR again, the UE no longer locally measures the NR neighboring cell, and no longer responds to a measurement event B1 on the network side.

Option 3: If the UE is currently in an RRC idle mode, the UE no longer directly measure the NR neighboring cell, and no longer responds to the measurement event B1 on the network side.

By using the foregoing method 1 for reducing UE power consumption, power consumption of the UE can be reduced.

Figure 7A:
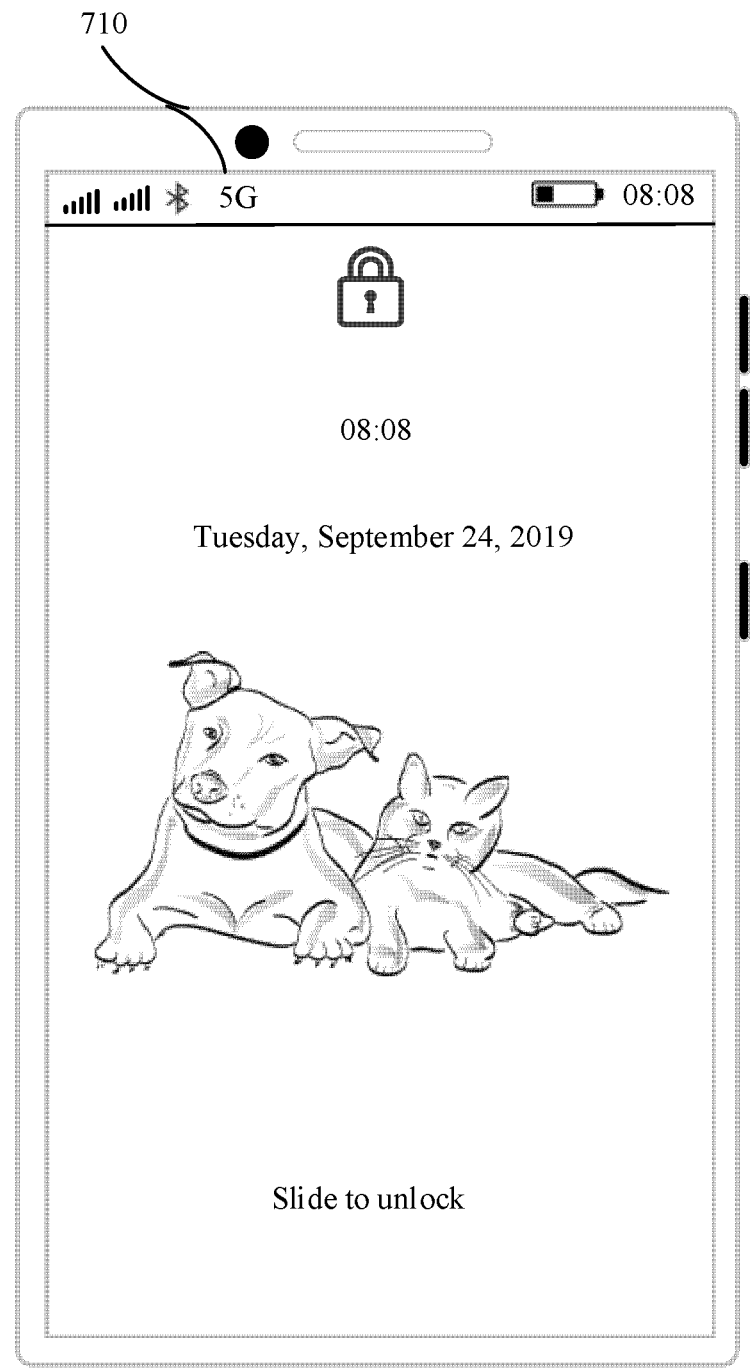
FIG. 7A-FIG. 7E are schematic diagrams of displaying a network standard icon of a UE according to an embodiment of the present disclosure.
Figure 7B:
Figure 7C:
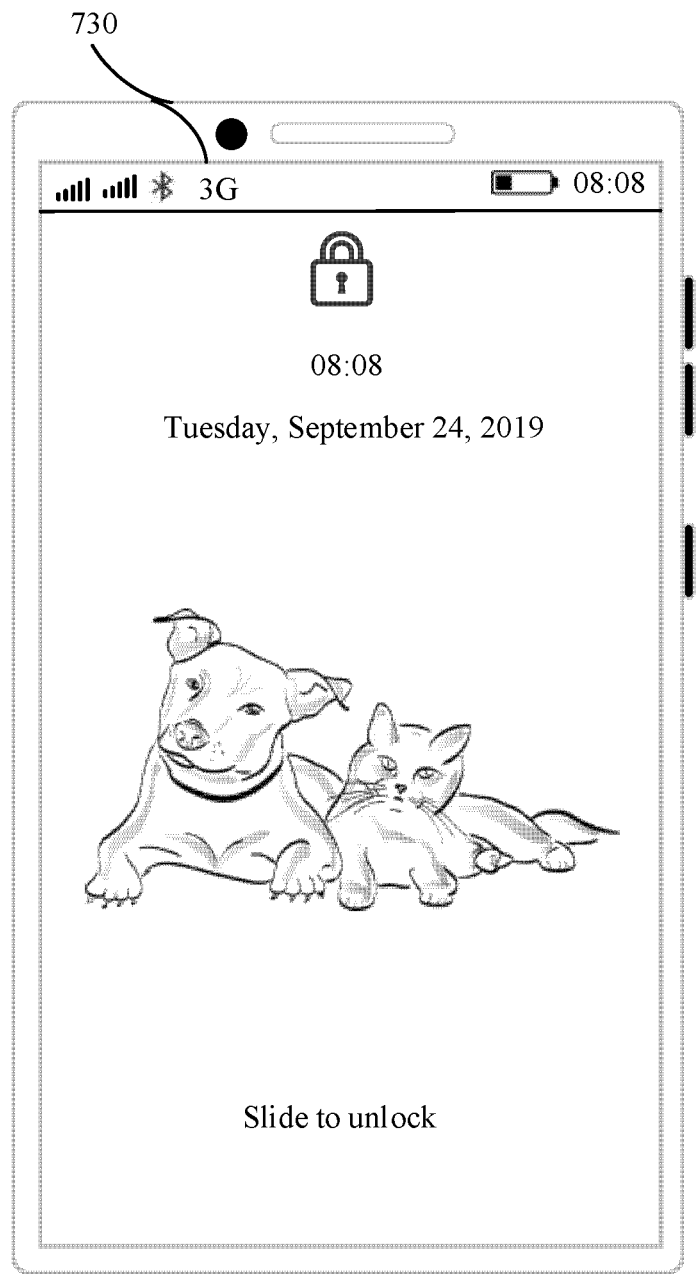
Figure 7D:
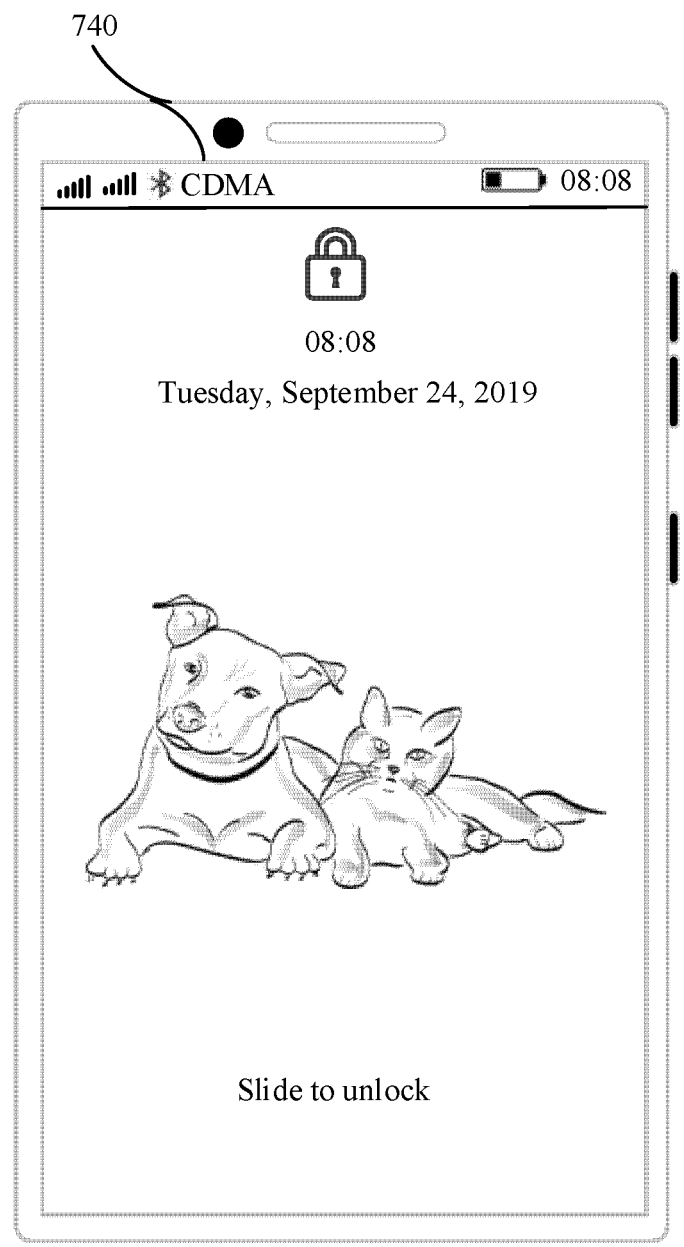
Figure 7E:

The options listed in method 1 for reducing UE power consumption may affect displaying of a 5G icon. After the SCG is no longer added, whether the 5G icon is displayed depends on a policy for displaying the 5G icon. FIG. 7A-FIG. 7E are schematic diagrams of displaying a network standard icon of a UE according to an embodiment of the present disclosure. FIG. 7A is a schematic diagram of a display state of a 5G icon according to an embodiment of the present disclosure. As shown in FIG. 7A, the word "5G" indicated by 710 is the 5G icon, and the display state is a state in which the UE normally displays the 5G icon. The display state shown in this figure and 710 is merely an example of displaying the 5G icon, and does not constitute a restriction on displaying of the 5G icon. Currently, the GSMA (Groupe Speciale Mobile Association) provides the following 5G icon displaying rules. For impact analysis, refer to Table 2.

TABLE 2

| Icon display scheme | Conditions for displaying the 5G icon | Impact of the method on the 5G icon |
|---|---|---|
| ConfigA | The UE is in a connected mode, and an NR SCG is added. | The 5G icon cannot be displayed. |
| ConfigB | The UE is in a connected mode, and an NR SCG is added; or The UE is in the idle mode, and an NR cell is detected. | The 5G icon cannot be displayed. |
| ConfigC | The UE is in the connected mode, and an NR SCG is added; or The UE is in the connected mode, and no NR SCG is added, but NR is detected; or the UE is in the idle mode, and an NR cell is detected. | The 5G icon cannot be displayed. |
| ConfigD | The UE needs to support only NR, and it is not necessary to consider whether the UE detects NR or whether NR is in a connected mode. | The 5G icon can be displayed. |

A beneficial effect of the method is as follows: Under the rule in the icon display scheme ConfigD, the method does not affect displaying of the 5G icon of the UE, and does not reduce user experience. However, under other rules, the UE cannot display the 5G icon, and display states of a network standard icon of the UE may include the states shown in the schematic diagrams shown in FIG. 7B-FIG. 7B. That is, the UE may display a "4G" icon indicated by 720; or the UE may display a "3G" icon indicated by 730; or the UE may display a "CDMA" icon indicated by 740; or as indicated by 750, the UE may not display any network standard icon.

Method 2 for reducing UE power consumption: If the APN-AMBR parameter is less than the set threshold, the EN-DC capability of the UE is directly disabled.

Figure 8:
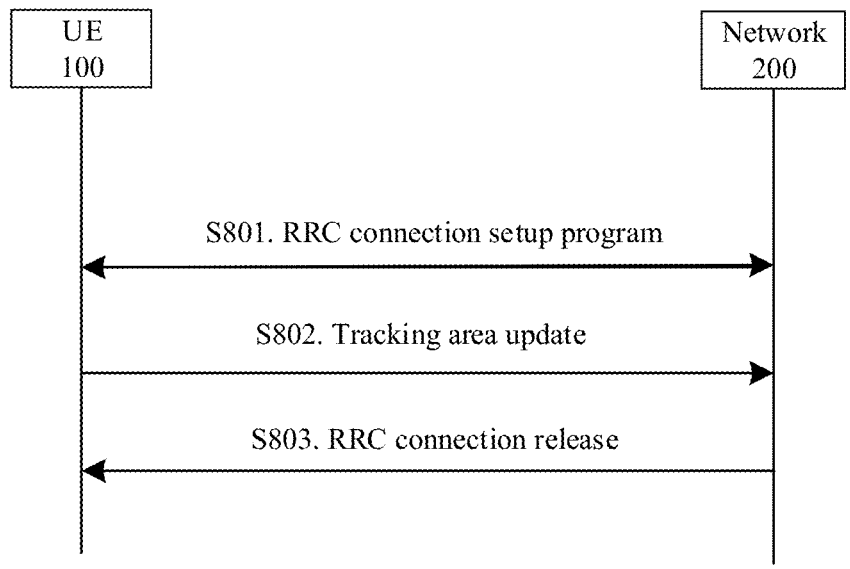
FIG. 8 is a schematic diagram of another method for starting power consumption reduction by a UE in a 5G NSA networking mode according to an embodiment of the present disclosure.

FIG. 8 is a schematic diagram of another method for starting power consumption reduction by a UE in a 5G NSA networking mode according to an embodiment of the present disclosure. FIG. 8 describes content of method 2 for reducing UE power consumption, and the method mainly includes the following steps:

S801. Perform an RRC connection setup procedure between a network side and a UE side.
S802. A UE sends TAU (Tracking Area Update) signaling.
S803. The network side releases an RRC connection of the UE.

The TAU signaling sent by the UE to the network side carries an IE field, and the IE field may be used to disable an EN-DC capability of the UE.

It should be noted that, when the UE is in an RRC connected mode, only step 802 needs to be included to implement method 2 for reducing UE power consumption; or when the UE is in an RRC idle mode, step S801, step S802, and step S803 need to be included to implement the method.

In the foregoing method 2 for reducing UE power consumption, the EN-DC capability of the UE can be completely disabled, so as to reduce power consumption of the UE.

However, it should be noted that, in method 2 for reducing UE power consumption, displaying of the 5G icon on the UE is affected. In this embodiment of the present disclosure, the UE may provide a proper prompt to ensure that the user is notified, so as to prevent the user from being confused about the inability to display the 5G icon. A prompting method may include:

A dialog box is displayed on a screen of the UE to notify a user that because an Internet speed of the UE is limited, a function of disabling the 5G will be enabled to reduce power consumption, the 5G icon will disappear, and an icon of another network standard will be displayed; and the user can decide by himself whether to agree to the operation of reducing power consumption, and the user is provided with a confirmation or rejection option in the dialog box; or a dialog box is displayed on a screen of the UE, and the user is notified, in a voice prompt manner, that because the Internet speed of the UE is limited, a function of disabling the 5G will be enabled to reduce power consumption, the 5G icon will disappear, and an icon of another network mode will be displayed; and the user can decide by himself whether to agree to the operation of reducing power consumption, and the user is provided with a confirmation or rejection option in the dialog box; or the UE may not give any prompt.

Method 3 for reducing UE power consumption: If the APN-AMBR parameter is less than the set threshold, a millimeter wave function of the UE is directly disabled.

According to the 3GPP 38.101 protocol, the 5G NR mainly uses two frequencies: FR1 frequency band and FR2 frequency band. A frequency range of the FR1 frequency band is 450 MHz-6 GHz, which is also referred to as sub-6 GHz. A frequency range of the FR2 frequency band is 24.25 GHz-52.6 GHz, that is, a millimeter wave (mmWave). Because the millimeter wave function only exists on NR, and power consumption is high, if the UE supports the millimeter wave, the millimeter wave function can be directly disabled.

In the foregoing method 3 for reducing UE power consumption, the millimeter wave function of the UE may be completely disabled, so as to reduce power consumption of the UE.

Method 4 for reducing UE power consumption: If the APN-AMBR parameter is less than the set threshold, the UE retains an EN-DC capability, but another capability of the UE is reduced.

Compared with LTE, NR still has some other advantages, such as a relatively low delay and a larger user capacity. In this method embodiment, the UE may continue to retain the EN-DC capability, but another capability of the UE may be reduced, so as to minimize power consumption of the UE while ensuring better user experience. Options for reducing another capability of the UE include the following:

Option 1: A 3GPP protocol (hereinafter referred to as "protocol") only requires that a quantity of antennas supported by the UE on an LTE operating frequency band should be 1T2R, that is, a downlink requirement is at least 2*2 MIMO (Multi-input Multi-output). In this case, the UE may disable a configuration capability of the 4*4 MIMO, and enable only 2*2 MIMO, so as to reduce antenna resource overheads and reduce power consumption.

Option 2: For the operating frequency bands of NR, the protocol only requires that a configuration capability of 4*4 MIMO need to be supported on the n7, n38, n41, n77, n78, and n79 frequency bands. There is no such a requirement on another operating frequency band. The UE may disable a configuration capability of 4*4 MIMO on another operating frequency band, so as to reduce antenna resource overheads and reduce power consumption.

Option 3: The UE may disable an NR-CA function to reduce power consumption. CA (Carrier Aggregation) to aggregate a plurality of carriers for data transmission. Because a frequency band available to each operator is limited and may not be consecutive, if each UE can use only a few of the frequency bands, a rate of the UE is limited. The CA technology is to aggregate spectrum resources of a same frequency band or different frequency bands for use by the UE, so as to increase a rate of the UE. In this embodiment, the NR-CA function is disabled, so as to reduce power consumption.

Option 4: In an NSA scenario, the UE supports a CA capability in both LTE and NR, that is, both LTE and NR support the capability of multi-CC (Component Carrier). In this scenario, the capability of the UE in LTE and NR may be tailored, that is, the UE side reports only the capability of a single CC of LTE and the capability of a single CC capability of NR to the network side, so as to reduce power consumption of the UE.

Option 5: The UE may disable an HPUE (High-Power User Equipment) capability on all operating frequency bands, so that only the capability of 23 dBm and the capability of 26 dBm are supported on these operating frequency bands. The UE is limited to performing transmission at a maximum output power of 23 dBm, so that power of the UE can be effectively reduced.

Option 6: The UE may disable a TDM (Time Division Multiplexing) capability of uplink transmit power of LTE and NR, so that the UE supports only 20 dBm rather than 23 dBm in both LTE and NR. In this way, uplink power consumption overheads of the UE can be reduced.

All the options in method 4 for reducing UE power consumption need to be implemented by reporting, by the UE, capabilities of the UE again. Specifically, the network side may be notified of the capabilities of the UE by using a TAU or the re-attaching method, so as to effectively reduce power consumption of the UE.

Method 5 for reducing UE power consumption: If the APN-AMBR parameter is less than the set threshold, the EN-DC capability of the UE is disabled, and when the UE provides a service in the LTE mode, capabilities of the UE are further limited.

In method 5 for reducing UE power consumption, the EN-DC capability of the UE is directly disabled, and when the UE provides a service in LTE, the capabilities of the UE are further limited, so that the UE matches a rate limit provided by a current network (for example, the rate limit is reduced to Category 4). Referring to Table 3 (only low-rate categories defined by 3GPP are listed), among the categories in LTE that are defined in the protocol, a lower corresponding LTE CAT can be selected based on a rate limit, that is, a level of a transmission rate that can be supported by the UE, so as to reduce power consumption.

TABLE 3

| Category | Rate limit | Remarks |
| --- | --- | --- |
| Category 4 | Downlink: 150 Mbps; uplink: 50 Mbps. | Downlink: 1 CC; uplink: 1 CC. |
| Category 5 | Downlink: 300 Mbps; uplink: 75 Mbps. | Downlink: 2 CCs; uplink: 1 CC. |
| Category 6 | Downlink: 300 Mbps; uplink: 50 Mbps. | Downlink: 2 CCs; uplink: 1 CC. |

Method 5 for reducing UE power consumption needs to be implemented by reporting, by the UE, capabilities of the UE again. Specifically, the network side may be notified of the capabilities of the UE by using the TAU signaling or the re-attaching method, so as to effectively reduce power consumption of the UE.

In this method for reducing UE power consumption, handling of abnormal scenarios such as UE restart, flight mode enabled by the UE, and modem restart also needs to be considered. From a perspective of reducing power consumption, the UE needs to ensure that when these scenarios occur, the UE can still keep the previous power consumption reduction measures effective. It should be noted that the UE power consumption reduction procedure in this embodiment of the present disclosure may be one of the foregoing methods or any combination of the foregoing methods, which is not limited in this embodiment of the present disclosure.

If the APN-AMBR parameter is greater than or equal to the set threshold, step S204 is performed: The UE determines whether a power consumption reduction procedure has been performed. If the UE has not performed the power consumption reduction procedure, the procedure is directly ended without changing an operating state of the UE.

If the APN-AMBR parameter is greater than or equal to the set threshold, and the UE has performed the power consumption reduction procedure, step S205 is performed: The UE starts a restoration procedure. An operating state of the UE before the UE starts the power consumption reduction procedure is a first operating state, an operating state of the UE after the UE starts the power consumption reduction procedure is a second operating state, and that the UE starts the restoration procedure indicates a process in which the operating state of the UE changes from the second operating state to the first operating state. The method for the restoration procedure includes:

Method 1 for the restoration procedure: If the APN-AMBR parameter is not less than the set threshold, and the UE has performed the power consumption reduction procedure, the UE is re-enabled to locally measure a NR neighboring cell, so as to restore a standard protocol procedure.

Figure 9:
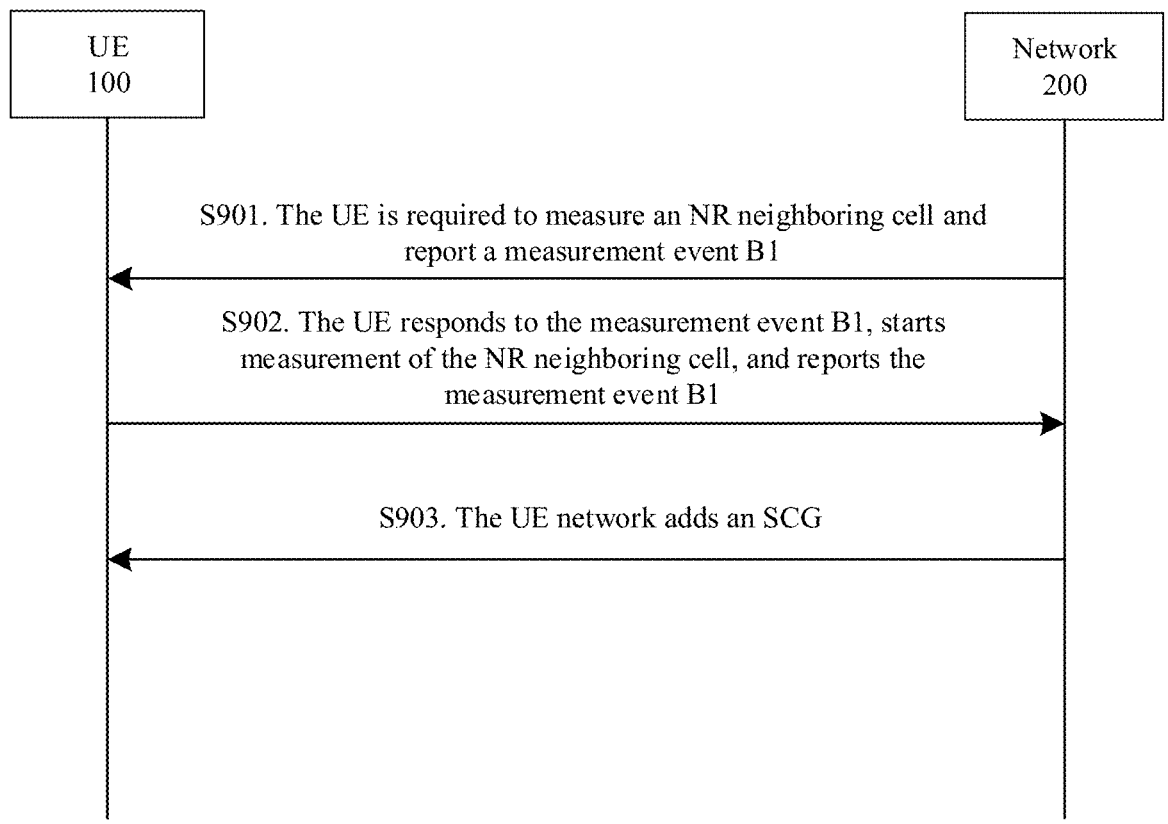
FIG. 9 is a schematic diagram of a method for starting a restoration procedure by a UE in a 5G NSA networking mode according to an embodiment of the present disclosure.

FIG. 9 is a schematic diagram of a method for starting a restoration procedure by a UE in a 5G NSA networking mode according to an embodiment of the present disclosure.

S901. A network side requests the UE to measure an NR neighboring cell and report a measurement event B1.

S902. The UE responds to the measurement event B1, and the UE locally starts measurement of the NR neighboring cell as required, and reports the event B1 to the network side.

S903. A UE network adds an SCG.

In method 1 for the restoration procedure, the UE may be re-enabled to locally measure the NR neighboring cell, so as to restore a normal operating state of the UE.

Method 2 for the restoration procedure: If the APN-AMBR parameter is not less than the set threshold, and the UE has performed the power consumption reduction procedure, an EN-DC capability of the UE is re-enabled.

Referring to FIG. 8, a procedure of restoring the UE is the same as that in FIG. 8. However, in step S802, the UE sends a TAU to the network side, and the TAU carries an IE field used to re-enable the EN-DC capability of the UE.

In method 2 for the restoration procedure, the EN-DC capability of the UE may be re-enabled, so as to restore a normal operating state of the UE.

Method 3 for the restoration procedure: If the APN-AMBR parameter is not less than the set threshold, and the UE has performed the power consumption reduction procedure, a millimeter wave function of the UE is re-enabled.

In method 3 for the restoration procedure, the millimeter wave function of the UE may be re-enabled, so as to restore a normal operating state of the UE.

Method 4 for the restoration procedure: If the APN-AMBR parameter is not less than the set threshold, and the UE has performed the power consumption reduction procedure, capabilities of the UE are restored. To report the capabilities of the UE again, the UE may notify the network side of new capabilities of the UE by sending a TAU to the network side or by using the re-attaching method, so as to restore an initial operating state of the UE.

In method 4 for the restoration procedure, the capabilities of the UE may be restored, so as to restore a normal operating state of the UE.

Method 5 for the restoration procedure: If the APN-AMBR parameter is not less than the set threshold, and the UE has performed the power consumption reduction procedure, to report the capabilities of the UE again, the UE may notify the network side of new capabilities of the UE by sending a TAU to the network side or by using the re-attaching method, so as to restore an initial operating state of the UE.

In method 5 for the restoration procedure, the capabilities of the UE may be restored, so as to restore a normal operating state of the UE.

It should be noted that, in this embodiment, the restoration procedure in the 5G NSA networking mode should be in a one-to-one correspondence with the power consumption reduction procedure.

A beneficial effect of Embodiment 1 of the present disclosure is as follows: After it is determined whether the APN-AMBR parameter obtained by the UE is less than the set threshold, and it is detected that the Internet speed of the UE is limited, measures that may be taken by the UE to reduce power consumption include: The UE actively releases the SCG, disables the EN-DC capability, disables the millimeter wave function of the UE, and reduces another capability of the UE (a specific method includes disabling a CA, disabling antenna diversity, and reducing an LTECategory). Therefore, power consumption of the UE may be significantly reduced, and the standby time of the user equipment is increased, and user experience is improved. When the user performs repayment or an operator resumes the user's service at the beginning of a month, the Session-AMBR parameter obtained by the UE will not be less than the set threshold, and a restoration procedure is started to restore the normal operating state of the UE network Embodiment 2 of the present disclosure provides a method for reducing UE power consumption in a 5G SA networking mode.

Figure 10:
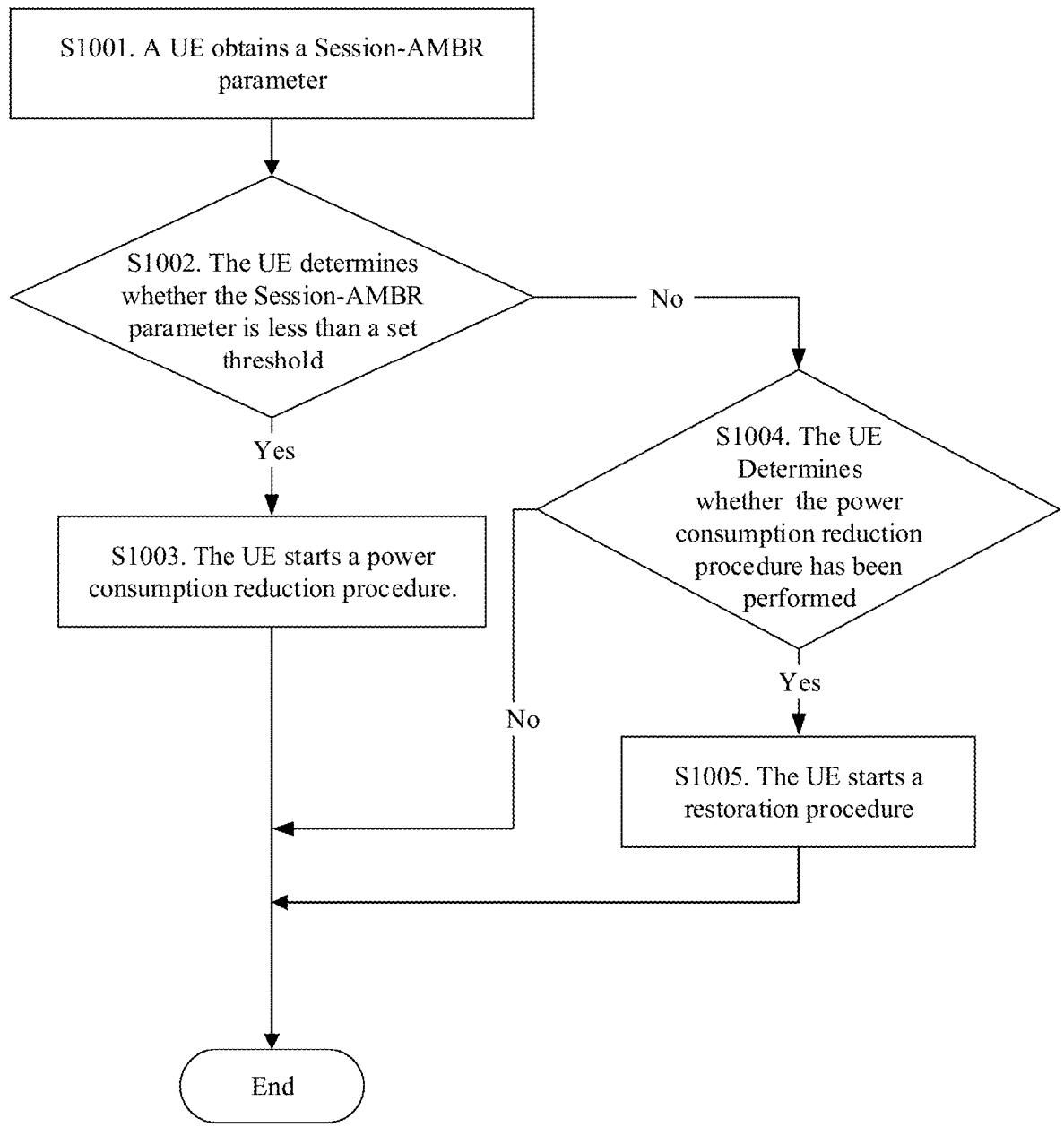
FIG. 10 is a schematic flowchart of reducing UE power consumption in a 5G SA networking mode according to an embodiment of the present disclosure.

FIG. 10 is a schematic flowchart of reducing UE power consumption in a 5G SA networking mode according to an embodiment of the present disclosure. In Embodiment 2 of the present disclosure, a method for reducing UE power consumption in a 5G SA networking mode includes:

S1001. The UE obtains a Session-AMBR (per Session-Aggregate Maximum Bit Rate) parameter.

Similar to the nature of APN-AMBR in LTE, Session-AMBR is an upper limit of a sum of bit rates of all non-GBR quality of service (QoS) flows of a protocol data unit (PDU) session, and the Session-AMBR may also be used to reflect an Internet speed allocated by a network service provider to the UE. In a 5G PDU session establishment process or session modification process, the UE may receive the Session-AMBR on a network side.

Figure 11:
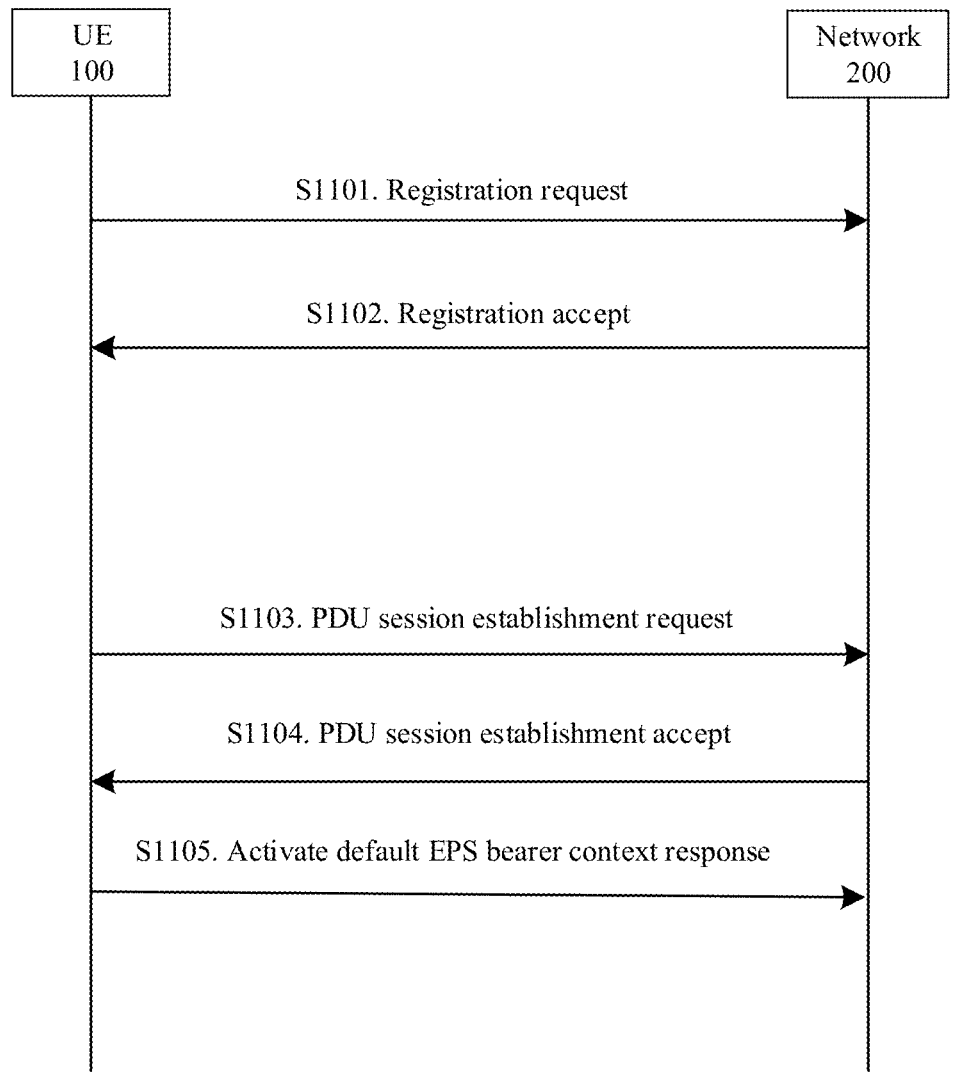
FIG. 11 is a schematic diagram of a 5G PDU session establishment process in a 5G SA networking mode according to an embodiment of the present disclosure.

FIG. 11 is a schematic diagram of a 5G PDU session establishment process in a 5G SA networking mode according to an embodiment of the present disclosure. A difference from PDN session establishment in LTE, a registration procedure and a PDU session establishment procedure are separate in 5G.

A method shown in FIG. 11 includes: S1101. A UE sends a registration request to a network side;
S1102. The network side sends registration accept signaling to the UE.
S1103. The UE sends PDU session setup request signaling to the network side.
S1104. The network side sends PDU session setup accept signaling to the UE, where the PDU session setup accept signaling carries a Session-AMBR parameter. In this process, the Session-AMBR parameter received by the UE may be used to determine whether an Internet speed of the UE limited.

Figure 12:
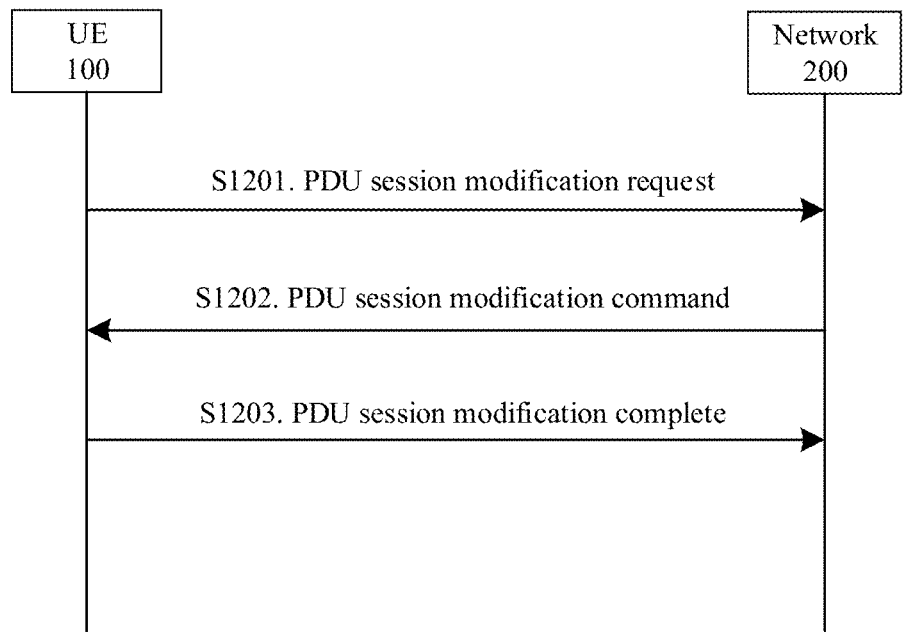
FIG. 12 is a schematic diagram of a 5G PDU session modification process in a 5G SA networking mode according to an embodiment of the present disclosure.

FIG. 12 is a schematic diagram of a 5G PDU session modification process in a 5G SA networking mode according to an embodiment of the present disclosure.

The PDU session modification process may be initiated by a UE. A method shown in FIG. 12 includes: S1201: The UE sends a PDU session modification request to the network side; step S1202: The network side sends a PDU session modification command to the UE; and S1203: The UE sends a PDU session modification complete message to the network side. The entire PDU session modification process is completed. The PDU session modification command sent by the network side to the UE carries a Session-AMBR parameter. In this process, the Session-AMBR parameter received by the UE may be used to determine whether an Internet speed of the UE limited.

Figure 13:
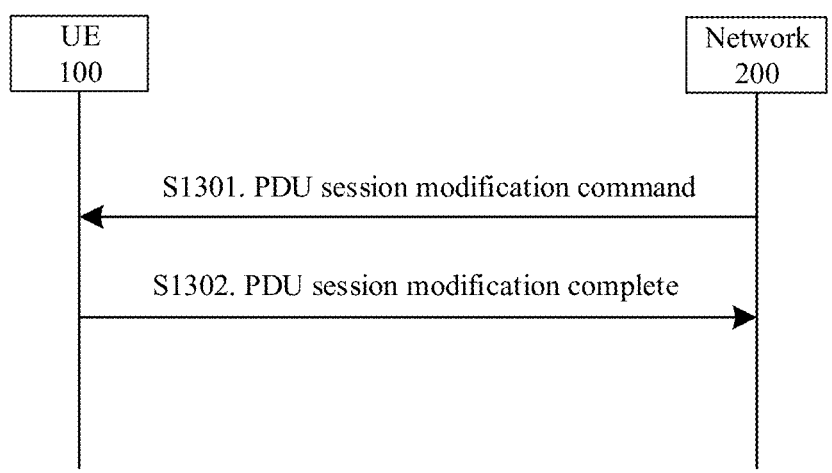
FIG. 13 is a schematic diagram of another 5G PDU session modification process in a 5G SA networking mode according to an embodiment of the present disclosure.

FIG. 13 is a schematic diagram of another 5G PDU session modification process in a 5G SA networking mode according to an embodiment of the present disclosure.

The PDU session modification process may alternatively be initiated by a network side. A method shown in FIG. 13 includes: step S1301: The network side sends a PDU session modification command to a UE; and step S1302: The UE sends a PDU session modification complete message to the network side. The PDU session modification command sent by the network side to the UE carries a Session-AMBR parameter. In this process, the Session-AMBR parameter received by the UE may be used to determine whether an Internet speed of the UE limited.

S1002. The UE determines whether the Session-AMBR parameter is less than a set threshold.

The UE determines whether a value of the Session-AMBR that is obtained by the UE is less than the set threshold, where the set threshold is a value used to indicate whether an Internet speed of the UE is limited. For example, the Internet speed of a 5G package is 1 Gbps-4.5 Gbps, and the set threshold may be set to 1 Gbps. When the value of the Session-AMBR is less than 1 Gbps, it means that the Internet speed of the UE is limited. In this embodiment, the threshold may be set based on an actual scenario of the user. The value of the threshold is not limited in the present disclosure.

Before the step of determining whether the value of the Session-AMBR that is obtained by the UE is less than the set threshold, setting the set threshold is further included. Methods for setting the set threshold include:

Optional threshold setting method 1: The UE uses a first value entered by the user as a set threshold: For example, a function menu bar is added to a system of the UE, so that the user can independently select a threshold in the menu bar.

For example, the user may select a threshold in the UE mobile network setting function menu, or the user may enter a threshold in the UE mobile network setting function dialog box, or the user may set a threshold in a UE voice assistant by using a voice input.

Optional threshold setting method 2: The UE sets a value of a network configuration parameter of the UE that is obtained when the Internet speed of the UE is not limited to the set threshold: For example, when the UE registers with a 5G network for the first time, the UE may obtain the Session-AMBR parameter in the attach process, and the UE may set the Session-AMBR parameter to the threshold.

The Session-AMBR parameter obtained by the UE includes a value of an uplink speed and a value of a downlink speed. A method for determining, by the UE, whether the Session-AMBR is less than the set threshold includes:

The UE determines whether the value of the uplink speed in the Session-AMBR parameter that is obtained by the UE is less than a set first threshold, for example, the uplink speed in the Session-AMBR parameter is less than 0.5 Gbps.

Alternatively, the UE determines whether the value of the downlink speed in the Session-AMBR parameter that is obtained by the UE is less than a set second threshold, for example, the downlink speed in the Session-AMBR parameter is less than 1 Gbps.

Alternatively, the UE determines whether the value of the uplink speed in the Session-AMBR parameter that is obtained by the UE is less than a set third threshold, and the UE determines whether the value of the downlink speed in the Session-AMBR parameter that is obtained by the UE is less than a set fourth threshold, for example, the uplink speed in the Session-AMBR parameter is less than 0.5 Gbps, and the downlink speed in the Session-AMBR parameter is less than 1 Gbps.

If the Session-AMBR parameter is less than the set threshold, step 1003 is performed: The UE starts a power consumption reduction procedure. There may be a plurality of methods for reducing UE power consumption. The methods for reducing UE power consumption include:

Method 1 for reducing UE power consumption: If the Session-AMBR parameter is less than the set threshold, a millimeter wave function of the UE is directly disabled.

According to the 3GPP 38.101 protocol, the 5G NR mainly uses two frequencies: FR1 frequency band and FR2 frequency band. A frequency range of the FR1 frequency band is 450 MHz-6 GHz, which is also referred to as sub-6 GHz. A frequency range of the FR2 frequency band is 24.25 GHz-52.6 GHz, that is, a millimeter wave (mmWave). Because the millimeter wave function only exists on NR, and power consumption is high, if the UE supports the millimeter wave, the millimeter wave function can be directly disabled.

In the foregoing method 1 for reducing UE power consumption, the millimeter wave function of the UE may be completely disabled, so as to reduce power consumption of the UE.

Method 2 for reducing UE power consumption: If the Session-AMBR parameter is less than the set threshold, the UE continues to camp on NR, but another capability of the UE is reduced.

Considering that compared with LTE, NR still has some other advantages, such as a relatively low delay and a large user capacity. In this method, the UE may continue to camp on NR, but another capability of the UE may be reduced, so as to minimize power consumption while ensuring a relatively low flow rate experience. The specific option of reducing another capability of the UE includes:

Option 1: For the operating frequency bands of NR, the protocol only requires that a configuration capability of 4*4 MIMO need to be supported on the n7, n38, n41, n77, n78, and n79 frequency bands. There is no such a requirement on another operating frequency band. The UE may disable a configuration capability of 4*4 MIMO on another operating frequency band, so as to reduce antenna resource overheads and reduce power consumption.

Option 2: The UE may disable the NR CA function to reduce power consumption.

Option 3: The UE can disable the HPUE capability on all operating frequency bands, so that only the capability of 23 dBm and the capability of 26 dBm are supported on these operating frequency bands.

All the options in the foregoing method for reducing UE power consumption need to be implemented by reporting, by the UE, capabilities of the UE again. Specifically, the UE may notify the network side of the capabilities of the UE by sending a TAU to the network side or using the re-registration method, so as to effectively reduce power consumption of the UE.

Method 3 for reducing UE power consumption: If the Session-AMBR parameter is less than the set threshold, the UE uses fewer resources.

Figure 14:
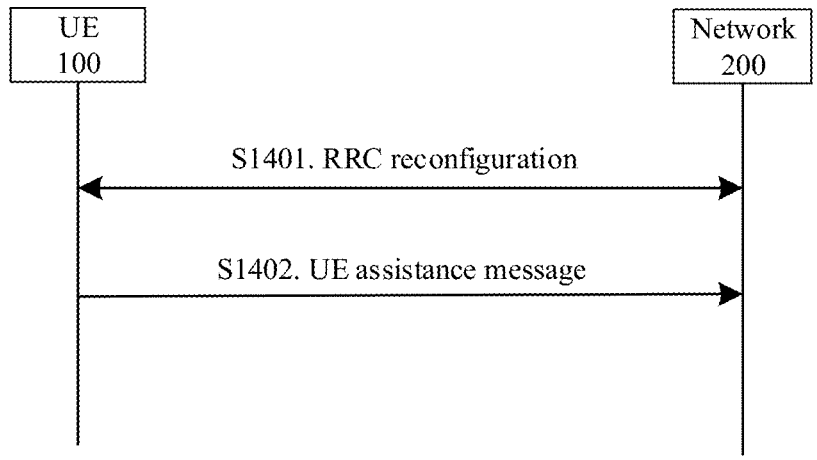
FIG. 14 is a schematic diagram of another method for starting power consumption reduction by a UE in a 5G SA networking mode according to an embodiment of the present disclosure.

FIG. 14 is a schematic diagram of another method for starting power consumption reduction by a UE in a 5G SA networking mode according to an embodiment of the present disclosure. As shown in FIG. 14, after each RRC connection is established, the UE may alternatively notify, by using a UE assistance message, a network side that fewer CCs are used by the UE, fewer MIMO layers are used by the UE, or a lower aggregate bandwidth is used by the UE.

The foregoing method for reducing UE power consumption may enable the UE to use fewer resources, thereby reducing power consumption of the UE.

If the Session-AMBR parameter is not less than or equal to the set threshold, step S1004 is performed: The UE determines whether the UE has performed the power consumption reduction procedure. If the UE has not performed the power consumption reduction procedure, the procedure is directly ended without changing an operating state of the UE.

If the Session-AMBR parameter is greater than or equal to the set threshold, and the UE has performed the power consumption reduction procedure, step S1005 is performed: The UE starts a restoration procedure. An operating state of the UE before the UE starts the power consumption reduction procedure is a first operating state, an operating state of the UE after the UE starts the power consumption reduction procedure is a second operating state, and that the UE starts the restoration procedure indicates a process in which the operating state of the UE changes from the second operating state to the first operating state. The method for the restoration procedure includes:

Method 1 for the restoration procedure: If the Session-AMBR parameter is not less than the set threshold, and the UE has performed the power consumption reduction procedure, a millimeter wave function of the UE is re-enabled.

Method 2 for the restoration procedure: If the Session-AMBR parameter is not less than the set threshold, and the UE has performed the power consumption reduction procedure, capabilities of the UE are restored. Specific options for restoring the capabilities of the UE include:

Option 1: The UE may re-enable a configuration capability of 4*4 MIMO on all operating frequency bands.

Option 2: The UE may re-enable the NR CA function.

Option 3: The UE can re-enable the HPUE capability on all operating frequency bands to restore the capability of 26 dBm.

All the options in the foregoing method need to be implemented by reporting, by the UE, capabilities of the UE again. Specifically, the UE may notify the network side of the capabilities of the UE by sending a TAU to the network side or using the re-registration method, so as to effectively restore the capabilities of the UE.

Method 3: If the Session-AMBR parameter is not less than the set threshold, and the UE has performed a power consumption reduction procedure, resources used by the UE are restored.

After each RRC connection is established, the UE may notify the network side by using the UE assistance message, so as to indicate the UE to use a normal CC, the UE to use a normal MIMO Layer, or the UE to use a normal aggregate bandwidth.

It should be noted that, in this embodiment, the restoration procedure in the 5G SA networking mode should be in a one-to-one correspondence with the power consumption reduction procedure.

A beneficial effect of Embodiment 2 of the present disclosure is as follows: After it is determined whether the Session-AMBR parameter obtained by the UE is less than the set threshold, and it is detected that the Internet speed of the UE is limited, measures that may be taken by the UE to reduce power consumption include disabling the millimeter wave function of the UE, and reducing another capability of the UE (a specific method includes disabling a CA, disabling antenna diversity, and reducing an LTECategory). Therefore, power consumption of the UE may be significantly reduced, and the standby time of the user equipment is increased, and user experience is improved. When the user performs repayment or an operator resumes the user's service at the beginning of a month, the operator resumes the service of the user, the Session-AMBR parameter obtained by the UE is not less than the set threshold, and a restoration procedure is started to restore the normal operating state of the UE network.

Embodiment 3 of the present disclosure provides an apparatus for reducing UE power consumption.

Figure 15:
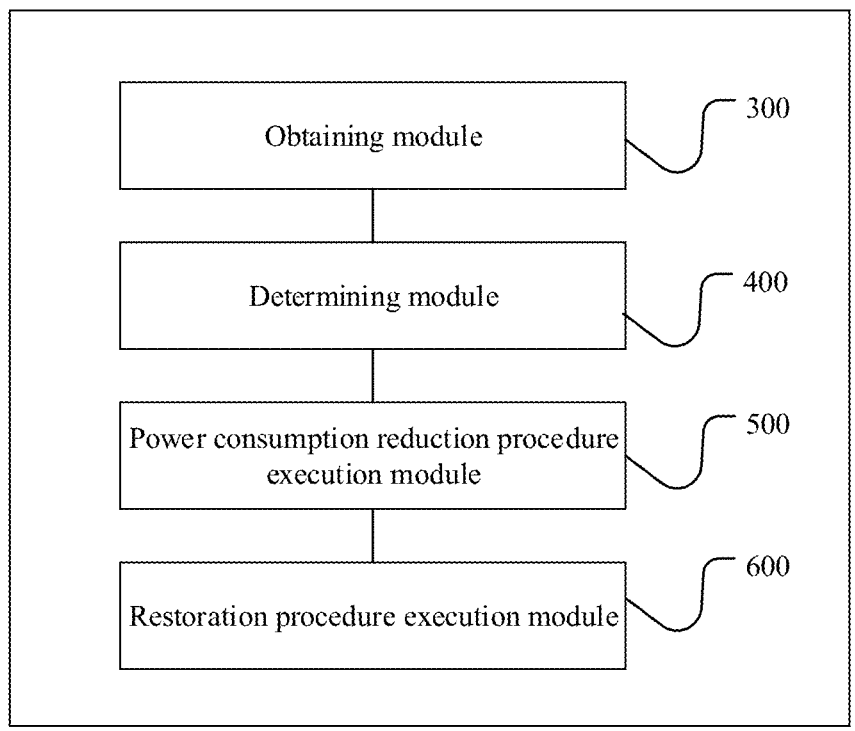
FIG. 15 is a schematic structural diagram of an apparatus for reducing UE power consumption according to an embodiment of the present disclosure.

FIG. 15 is a schematic structural diagram of an apparatus for reducing UE power consumption according to an embodiment of the present disclosure. The apparatus for reducing UE power consumption includes: an obtaining module 300, a determining module 400, a power consumption reduction procedure execution module 500, and a restoration procedure execution module 600.

Figure 16:
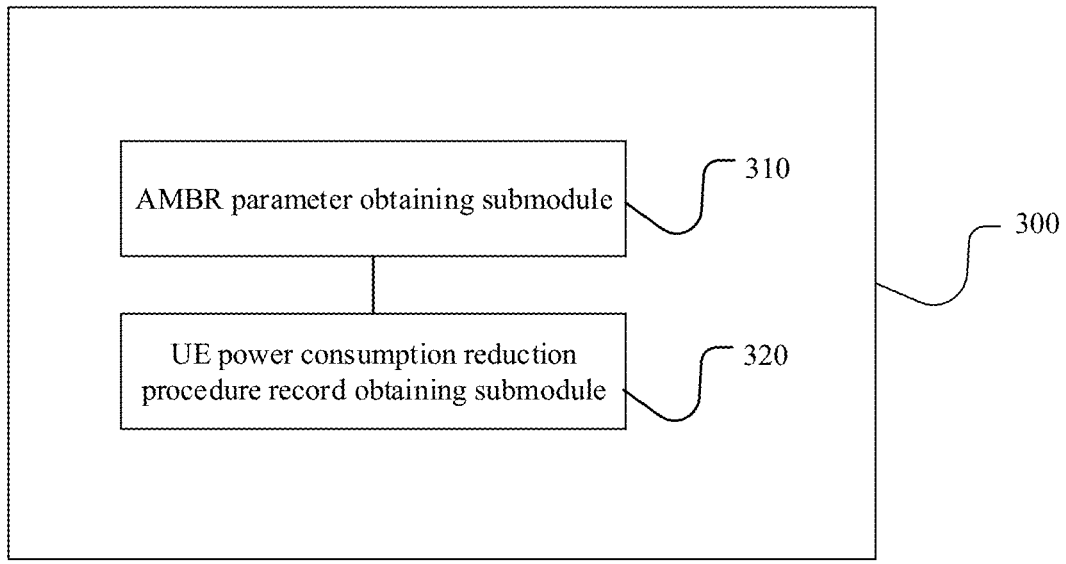
FIG. 16 is a schematic structural diagram of an obtaining module in an apparatus for reducing UE power consumption according to an embodiment of the present disclosure.

The obtaining module 300 is configured to obtain an APN-AMBR parameter, a Session-AMBR parameter, and a UE power consumption reduction procedure record. FIG. 16 is a schematic structural diagram of an obtaining module in an apparatus for reducing UE power consumption according to an embodiment of the present disclosure. The obtaining module 300 includes: an AMBR parameter obtaining submodule 310 and a UE power consumption reduction procedure record obtaining submodule 320.

It should be further noted that the AMBR parameter obtaining submodule 310 is configured to obtain an APN-AMBR parameter and a Session-AMBR parameter that are carried in signaling used in a session process between a UE and a network side when the UE is in a 5G NSA or SA networking mode. For a specific parameter obtaining manner and a specific parameter source, refer to the methods and steps described in step S201 in the method in Embodiment 1 of the present disclosure: A UE obtains an APN-AMBR parameter; and step S1001 in the method in Embodiment 2 of the present disclosure: The UE obtains a Session-AMBR parameter. Details are not described herein again.

The UE power consumption reduction procedure record obtaining submodule 320 is configured to obtain a UE power consumption reduction procedure record, that is, if the UE has performed the power consumption reduction method in this embodiment of the present disclosure, the UE power consumption reduction procedure record obtaining submodule 320 may obtain a record. For example, if the UE has performed the power consumption reduction procedure, a parameter X set therein is recorded as 1; otherwise, the parameter X is recorded as 0.

Figure 17:
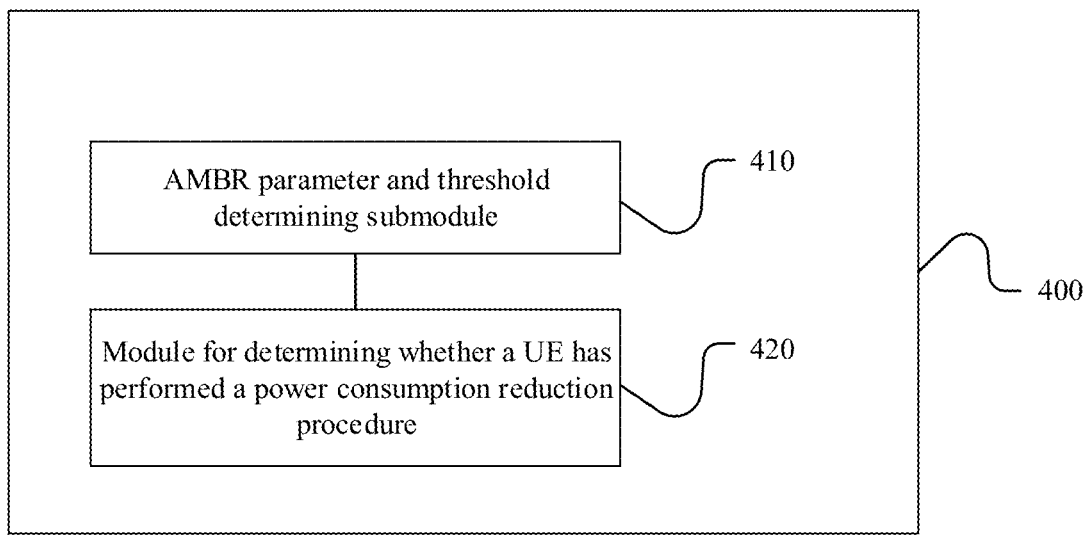
FIG. 17 is a schematic structural diagram of a determining module in an apparatus for reducing UE power consumption according to an embodiment of the present disclosure.

The determining module 400 is configured to determine whether the APN-AMBR parameter, the Session-AMBR parameter, and the UE power consumption reduction procedure record that are obtained by the obtaining module 300 meet a condition for executing the power consumption reduction procedure. If the APN-AMBR parameter, the Session-AMBR parameter, and the UE power consumption reduction procedure record meet the condition for executing the power consumption reduction procedure, the next power consumption reduction procedure will be executed. FIG. 17 is a schematic structural diagram of a determining module in an apparatus for reducing UE power consumption according to an embodiment of the present disclosure. The determining module 400 includes: an AMBR parameter and threshold determining submodule 410, and a submodule 420 for determining whether the UE has performed a power consumption reduction procedure.

It should be further noted that the AMBR parameter and threshold determining submodule 410 is configured to determine whether the APN-AMBR parameter and the Session-AMBR parameter that are obtained by the AMBR parameter obtaining submodule 310 are less than set thresholds, so as to determine whether an Internet speed of the UE is limited, and determine whether to further take a power consumption reduction measure. For a specific method for determining whether the APN-AMBR parameter and the Session-AMBR parameter are less than the set thresholds, refer to the methods and steps described in step S202 in the method in Embodiment 1 of the present disclosure: The UE determines whether the APN-AMBR parameter is less than a set threshold; and step S1002 in the method in Embodiment 2 of the present disclosure: The UE determines whether the Session-AMBR parameter is less than a set threshold. Details are not described herein again.

The submodule 420 for determining whether the UE has performed a power consumption reduction procedure is configured to determine whether the UE has performed the power consumption reduction procedure. A specific method may include: If the parameter X obtained by the UE power consumption reduction procedure record obtaining submodule 320 is greater than 0, it may be determined that the UE has performed the power consumption reduction procedure; otherwise, it may be determined that the UE has not performed the power consumption reduction procedure.

The power consumption reduction procedure execution module 500 is configured to execute the UE power consumption reduction procedure. For a specific method for the power consumption reduction procedure, refer to the methods and steps described in step S203 in Embodiment 1 of the present disclosure: The UE starts a power consumption reduction procedure; and step S1003 in Embodiment 2 of the present disclosure: The UE starts a power consumption reduction procedure. Details are not described herein again.

The restoration procedure execution module 600 is configured to execute a procedure in which the UE restores a normal operating state. For a specific method for the restoration procedure, refer to the methods and steps described in step S205 in Embodiment 1 of the present disclosure: The UE starts a restoration procedure; and step S1005 in Embodiment 2: The UE starts a restoration procedure. Details are not described herein again.

It should be noted that the methods and steps performed by the modules in the apparatus embodiment of the present disclosure need to be in a one-to-one correspondence with corresponding modes.

For example, if the apparatus is an apparatus for reducing UE power consumption in a 5G NSA networking mode, the obtaining module 300 performs S201 to obtain an APN-AMBR parameter; and obtains a UE power consumption reduction procedure record parameter X.

The determining module 400 is configured to perform S202 to determine whether the APN-AMBR parameter is less than a set threshold; and determines whether the UE power consumption reduction procedure record parameter X is greater than 0.

The power consumption reduction procedure execution module 500 is configured to perform step S203 to start a power consumption reduction procedure.

The restoration procedure execution module is configured to perform step S205 to start a restoration procedure.

For example, if the apparatus is an apparatus for reducing UE power consumption in a 5G SA networking mode, the obtaining module 300 performs S1001 to obtain a Session-AMBR parameter; and obtains a UE power consumption reduction procedure record parameter X.

The determining module 400 is configured to perform S1002 to determine whether the Session-AMBR parameter is less than a set threshold; and determines whether the UE power consumption reduction procedure record parameter X is greater than 0.

The power consumption reduction procedure execution module 500 is configured to perform step S1003 to start a power consumption reduction procedure.

The restoration procedure execution module is configured to perform step S1005 to start a restoration procedure.

Figure 18:
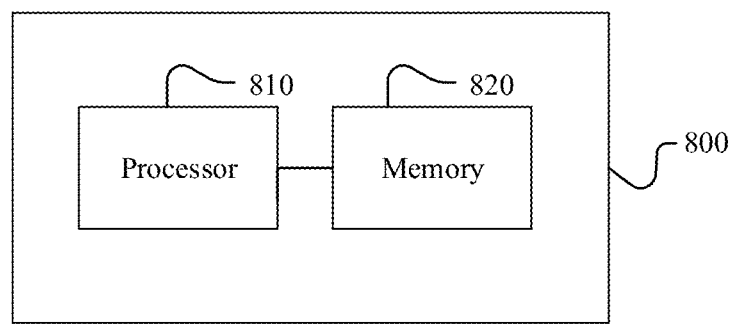
FIG. 18 is a schematic structural diagram of a UE apparatus according to an embodiment of the present disclosure.

Embodiment 4 of the present disclosure provides a UE, where the UE includes a processor and a memory. FIG. 18 is a schematic structural diagram of a UE apparatus according to an embodiment of the present disclosure.

It may be understood that the structure shown in this embodiment of the present disclosure does not constitute a specific limitation on a UE. In some other embodiments of the present disclosure, the UE may include more or fewer components than those shown in the figure, or some components are combined, or some components are split, or a different component arrangement is used. The components shown in the figure may be implemented by hardware, software, or a combination of software and hardware.

As shown in FIG. 18, the processor 810 may include one or more processing units. For example, the processor 810 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The memory 820 may be configured to store computer executable program code, where the executable program code includes an instruction. The processor 810 runs an instruction stored in the memory 820, so as to perform all the methods and steps for reducing UE power consumption described in Embodiment 1 of the present disclosure and Embodiment 2 of the present disclosure. The memory 820 may include a program storage area and a data storage area. The program storage area may store an operating system, an application program required by at least one function (for example, a sound play function or an image play function), or the like. The data storage area may store data (such as audio data or a phone book) created during use of the UE. In addition, the memory 820 may include a high-speed random access memory, and may also include a non-volatile memory, such as at least one magnetic disk storage device, a flash memory device, or a universal flash storage (UFS).

All or some of the foregoing embodiments may be implemented by software, hardware, or a combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for reducing user equipment (UE) power consumption, wherein the method comprises:
    obtaining, by a UE, a network configuration parameter of the UE, wherein the UE is an electronic device that supports a 5th generation mobile communications technology non-standalone (5G NSA) networking mode and/or a 5th generation mobile communications technology standalone (5G SA) networking mode;
    determining, by the UE, whether the network configuration parameter of the UE is less than a set threshold, wherein being less than the set threshold is used to indicate that an Internet speed of the UE is limited; and in response to the network configuration parameter of the UE being less than the set threshold, starting, by the UE, a power consumption reduction procedure.

2. The method according to claim 1, wherein:
wherein the UE is in the 5G NSA networking mode, wherein the network configuration parameter of the UE comprises an access point name-aggregate maximum bit rate (APN-AMBR) parameter, wherein the APN-AMBR is an upper limit of a sum of bit rates of all non-guaranteed bit rate (non-GBR) bearers of an access point name (APN), wherein the APN-AMBR, which is specific to an APN, is used as a subscription parameter of each APN to limit a cumulative bit rate of all public data network (PDN) connections in a same APN, and wherein a value of the APN-AMBR parameter indicates an Internet speed allocated by a network operator to the UE; or
wherein the UE is in the 5G SA networking mode, wherein the network configuration parameter of the UE comprises an aggregate maximum bit rate parameter of each session (Session-AMBR), wherein the Session-AMBR is an upper limit of a sum of bit rates of all non-GBR quality of service (QOS) flows of a protocol data unit (PDU) session, and wherein a value of the Session-AMBR parameter represents an Internet speed allocated by the network operator to the UE.

3. The method according to claim 1, wherein determining, by the UE, whether the network configuration parameter of the UE is less than the set threshold comprises:
in a case that the UE is in the 5G NSA networking mode, determining, by the UE, whether an uplink speed in an access point name-aggregate maximum bit rate (APN-AMBR) parameter is less than a set first threshold, and/or determining, by the UE, whether a downlink speed in the APN-AMBR parameter is less than a set second threshold; or
in a case that the UE is in the 5G SA networking mode, determining, by the UE, whether an uplink speed in an aggregate maximum bit rate parameter of each session (Session-AMBR) parameter is less than a set third threshold, and/or determining, by the UE, whether a downlink speed in the Session-AMBR parameter is less than a set fourth threshold.

4. The method according to claim 1, wherein before the determining, by the UE, whether the network configuration parameter of the UE is less than the set threshold, the method further comprises:
setting, by the UE, the set threshold, wherein setting the set threshold comprises:
using, by the UE, a first value entered by a user as the set threshold; or
setting, by the UE, a value of the network configuration parameter of the UE that is obtained when the Internet speed of the UE is not limited as the set threshold.

5. The method according to claim 1, wherein after the starting, by the UE, the power consumption reduction procedure, the method further comprises:
determining, by the UE, whether the UE has performed the power consumption reduction procedure;
determining, by the UE, whether the network configuration parameter of the UE is less than the set threshold; and
in response to determining that the UE has performed the power consumption reduction procedure and the network configuration parameter of the UE is not less than the set threshold, starting, by the UE, a restoration procedure, wherein an operating state of the UE before the UE starts the power consumption reduction procedure is a first operating state, an operating state of the UE after the UE starts the power consumption reduction procedure is a second operating state, and that the UE starts the restoration procedure indicates a process in which the operating state of the UE changes from the second operating state to the first operating state.

6. The method according to claim 1, wherein in a case that the UE is in the 5G NSA networking mode, starting the power consumption reduction procedure by the UE comprises:
disabling a Long Term Evolution (LTE) and 5G new radio (NR) dual-connectivity EN-DC (Eutra NR Dual Connectivity) capability of the UE.

7. The method according to claim 1, wherein in a case that the UE is in the 5G NSA networking mode, starting the power consumption reduction procedure by the UE comprises:
disabling a millimeter wave function of the UE.

8. The method according to claim 1, wherein in a case that the UE is in the 5G NSA networking mode, starting the power consumption reduction procedure by the UE comprises:
skipping disabling a Long Term Evolution (LTE) and 5G new radio (NR) dual-connectivity EN-DC (Eutra NR Dual Connectivity) capability of the UE;
skipping measuring an NR neighboring cell; and
skipping responding to an action of adding a secondary cell group (SCG) on a network side.

9. The method according to claim 1, wherein in a case that the UE is in the 5G NSA networking mode, starting the power consumption reduction procedure by the UE comprises:
retaining, by the UE, a Long Term Evolution (LTE) and 5G new radio (NR) dual-connectivity EN-DC (Eutra NR Dual Connectivity) capability, so as to reduce antenna resource configuration of the UE.

10. The method according to claim 1, wherein in a case that the UE is in the 5G NSA networking mode, starting the power consumption reduction procedure by the UE comprises:
disabling a new radio-carrier aggregation (NR-CA) function of the UE.

11. An apparatus for reducing user equipment (UE) power consumption, the apparatus comprising:
a processor; and
a memory storing a computer program comprising instructions that can be run on the processor, wherein when the processor executes the computer program, the UE is enabled to perform steps comprising:
obtaining a network configuration parameter of the UE, wherein the UE is an electronic device that supports a 5th generation mobile communications technology non-standalone (5G NSA) networking mode and/or a 5th generation mobile communications technology standalone (5G SA) networking mode;
determining whether the network configuration parameter of the UE is less than a set threshold, wherein being less than the set threshold is used to indicate that an Internet speed of the UE is limited; and
in response to the network configuration parameter of the UE being less than the set threshold, starting a power consumption reduction procedure.

12. The apparatus according to claim 11, wherein:
wherein the UE is in the 5G NSA networking mode, wherein the network configuration parameter of the UE comprises an access point name-aggregate maximum bit rate (APN-AMBR) parameter, wherein the APN-AMBR is an upper limit of a sum of bit rates of all non-guaranteed bit rate (non-GBR) bearers of an access point name (APN), wherein the APN-AMBR, which is specific to an APN, is used as a subscription parameter of each APN to limit a cumulative bit rate of all public data network (PDN) connections in a same APN, and wherein a value of the APN-AMBR parameter indicates an Internet speed allocated by a network operator to the UE; or wherein the UE is in the 5G SA networking mode, wherein the network configuration parameter of the UE comprises an aggregate maximum bit rate parameter of each session (Session-AMBR), wherein the Session-AMBR is an upper limit of a sum of bit rates of all non-GBR quality of service (QOS) flows of a protocol data unit (PDU) session, and wherein a value of the Session-AMBR parameter represents an Internet speed allocated by the network operator to the UE.

13. The apparatus according to claim 11, wherein determining whether the network configuration parameter of the UE is less than the set threshold comprises:

in a case that the UE is in the 5G NSA networking mode, determining whether an uplink speed in an access point name-aggregate maximum bit rate (APN-AMBR) parameter is less than a set first threshold, and/or determining whether a downlink speed in the APN-AMBR parameter is less than a set second threshold; or in a case that the UE is in the 5G SA networking mode, determining whether an uplink speed in an aggregate maximum bit rate parameter of each session (Session-AMBR) parameter is less than a set third threshold, and/or determining whether a downlink speed in the Session-AMBR parameter is less than a set fourth threshold.

14. The apparatus according to claim 11, wherein before the determining whether the network configuration parameter of the UE is less than the set threshold, the steps further comprise:

setting the set threshold, wherein setting the set threshold comprises:

using a first value entered by a user as the set threshold; or setting a value of the network configuration parameter of the UE that is obtained when the Internet speed of the UE is not limited as the set threshold.

15. The apparatus according to claim 11, wherein after the starting the power consumption reduction procedure, the steps further comprise:

determining whether the UE has performed the power consumption reduction procedure;

determining whether the network configuration parameter of the UE is less than the set threshold; and in response to determining that the UE has performed the power consumption reduction procedure and the network configuration parameter of the UE is not less than the set threshold, start a restoration procedure, wherein an operating state of the UE before the UE starts the power consumption reduction procedure is a first operating state, an operating state of the UE after the UE starts the power consumption reduction procedure is a second operating state, and that the UE starts the restoration procedure indicates a process in which the operating state of the UE changes from the second operating state to the first operating state.

16. The apparatus according to claim 11, wherein in a case that the UE is in the 5G NSA networking mode, starting the power consumption reduction procedure comprises:

disabling a Long Term Evolution (LTE) and 5G new radio (NR) dual-connectivity EN-DC (Eutra NR Dual Connectivity) capability of the UE.

17. The apparatus according to claim 11, wherein in a case that the UE is in the 5G NSA networking mode, starting the power consumption reduction procedure comprises:

disabling a millimeter wave function of the UE.

18. The apparatus according to claim 11, wherein in a case that the UE is in the 5G NSA networking mode, starting the power consumption reduction procedure comprises:

skipping disabling a Long Term Evolution (LTE) and 5G new radio (NR) dual-connectivity EN-DC (Eutra NR Dual Connectivity) capability of the UE;

skipping measuring an NR neighboring cell; and skipping responding to an action of adding a secondary cell group (SCG) on a network side.

19. The apparatus according to claim 11, wherein in a case that the UE is in the 5G NSA networking mode, starting the power consumption reduction procedure comprises:

retaining a Long Term Evolution (LTE) and 5G new radio (NR) dual-connectivity EN-DC (Eutra NR Dual Connectivity) capability, so as to reduce antenna resource configuration of the UE.

20. The apparatus according to claim 11, wherein in a case that the UE is in the 5G NSA networking mode, start the power consumption reduction procedure comprises:

disabling a new radio-carrier aggregation (NR-CA) function of the UE.

\* \* \* \* \*

UNITED STATES PATENT AND TRADEMARK OFFICE
CERTIFICATE OF CORRECTION

PATENT NO. : 12,137,411 B2
APPLICATION NO. : 17/766842
DATED : November 5, 2024
INVENTOR(S) : He et al.

It is certified that error appears in the above-identified patent and that said Letters Patent is hereby corrected as shown below:

In the Claims

Claim 2, Column 25, Line 23: "non-GBR quality of service (QOS)" should read -- non-GBR quality of service (QoS) --.

Claim 12, Column 27, Line 17: "non-GBR quality of service (QOS)" should read -- non-GBR quality of service (QoS) --.

Signed and Sealed this
Third Day of December, 2024

Katherine Kelly Vidal
*Director of the United States Patent and Trademark Office*